United States Patent [19]
Pritschow et al.

[11] Patent Number: 5,916,328
[45] Date of Patent: Jun. 29, 1999

[54] DEVICE FOR MOVING A BODY IN SPACE

[75] Inventors: Günter Pritschow, Stuttgart; Karl-Heinz Wurst, Korntal-Münchingen, both of Germany

[73] Assignee: VDW Verein Deutscher Werkzeugmashinenfabrikan e.v., Frankfurt/Main, Germany

[21] Appl. No.: 08/797,102

[22] Filed: Feb. 7, 1997

[30] Foreign Application Priority Data

Feb. 7, 1996 [DE] Germany .................... 196 04 420
Jan. 21, 1997 [DE] Germany .................... 197 01 830

[51] Int. Cl.$^6$ .................. B25J 18/00; B25J 17/02
[52] U.S. Cl. ................... 74/490.03; 74/490.01; 74/490.06; 414/735; 901/14; 901/23; 901/29
[58] Field of Search .................. 74/490.01, 490.03, 74/490.06; 414/735; 901/14, 23, 27, 29

[56] References Cited

U.S. PATENT DOCUMENTS

| | | | |
|---|---|---|---|
| 4,806,068 | 2/1989 | Kohli et al. | 414/735 |
| 4,872,363 | 10/1989 | Rosenthal | 74/479 |
| 5,148,091 | 9/1992 | Lagercrantz | 901/27 |
| 5,378,282 | 1/1995 | Pollard | 74/490.06 X |
| 5,603,243 | 2/1997 | Finley | 74/490.07 |

*Primary Examiner*—Allan D. Herrmann
*Attorney, Agent, or Firm*—Robert W. Becker & Associates

[57] ABSTRACT

A device for moving a rod body in a space includes a frame and connecting arms connected to the frame and having at least two degrees of freedom. The rod body is pivotably connected to the connecting arms. At least one drive is connected to each one of the connecting arms for controlling an active degree of freedom. The rod body has a first end point and a second end point. The first end point defines a spatial position within the space. The first and second end points together define the orientation of the rod body in the space. The connecting arms serve to control the first and second end points.

10 Claims, 23 Drawing Sheets

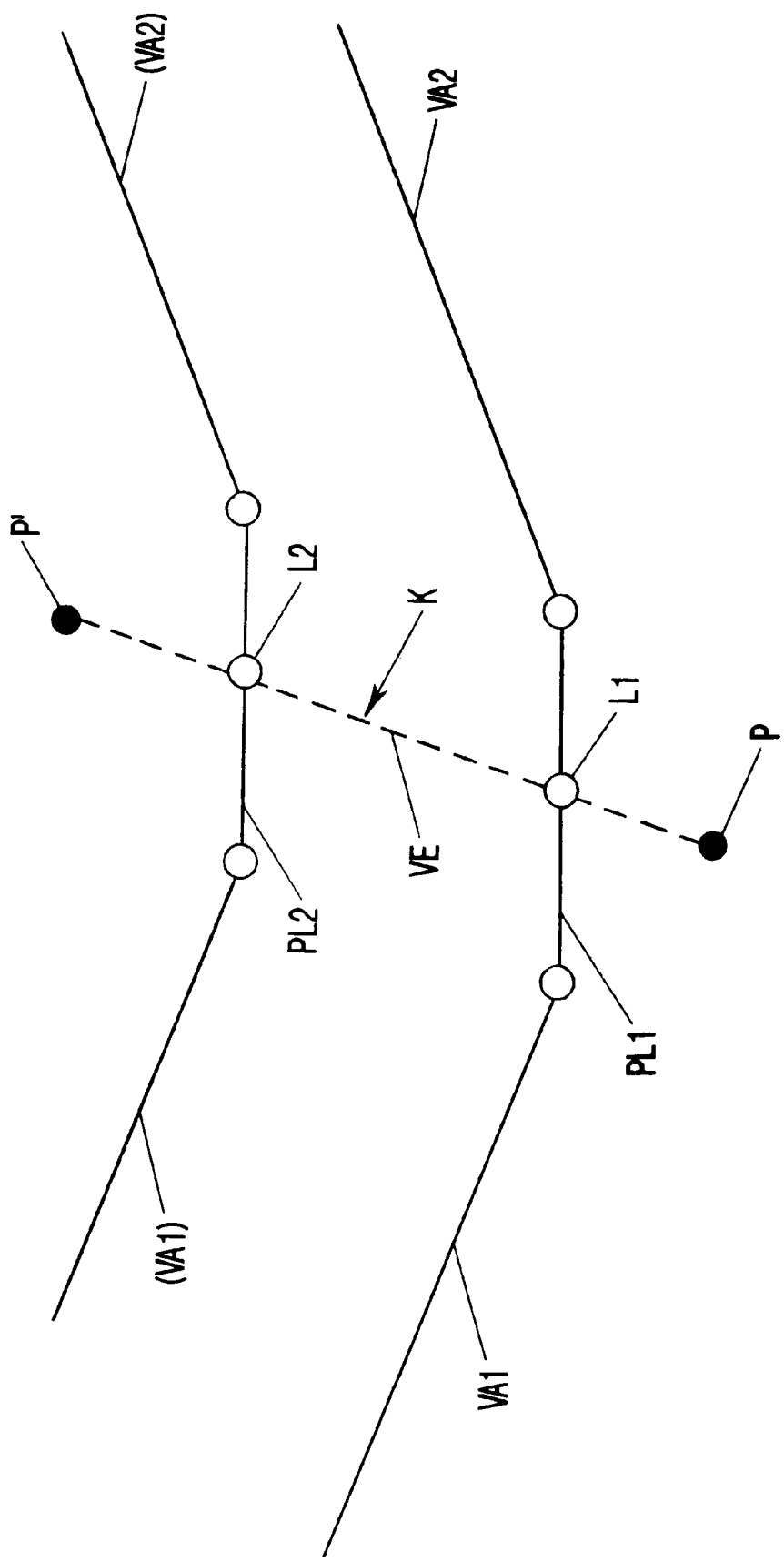

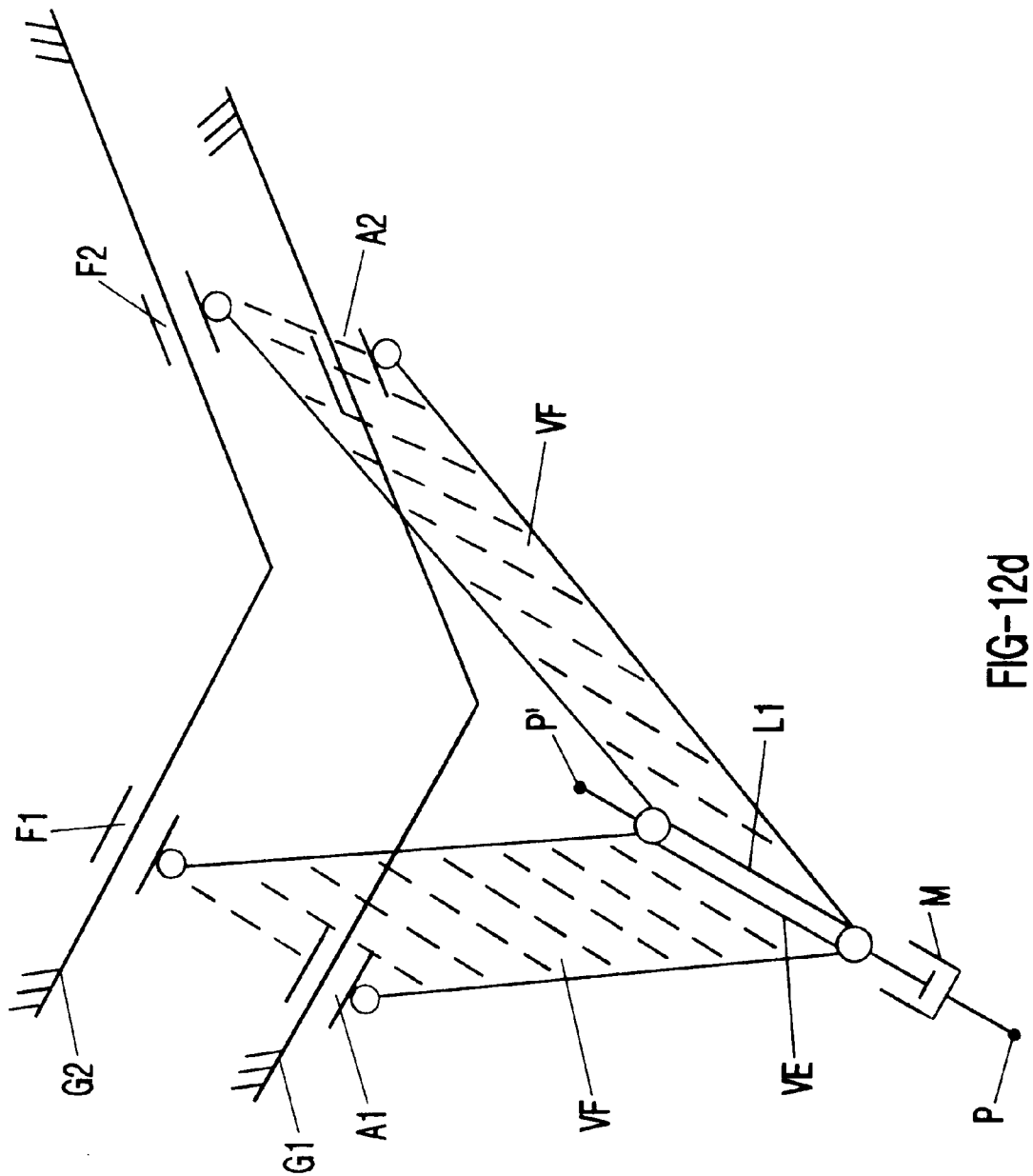

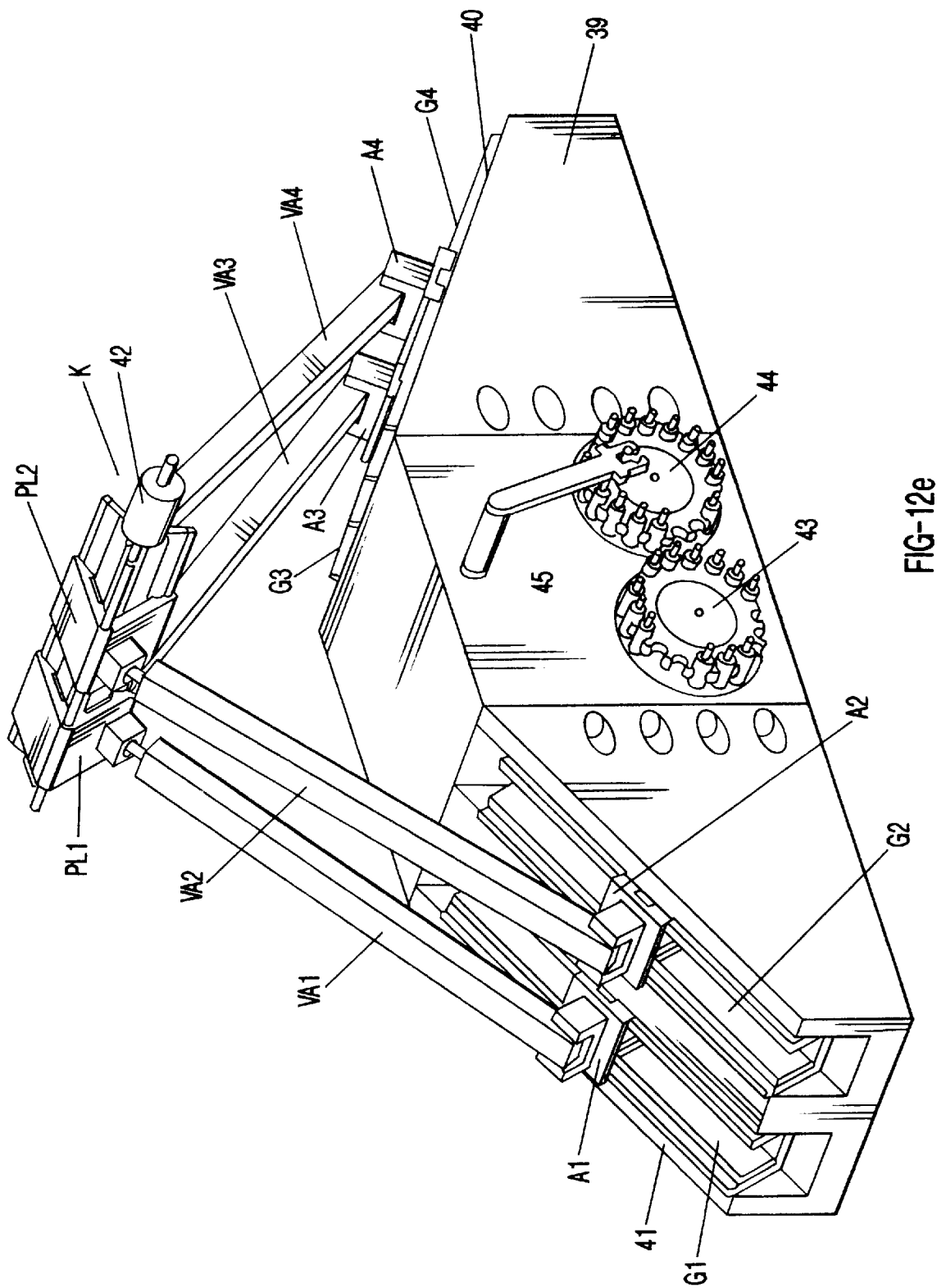

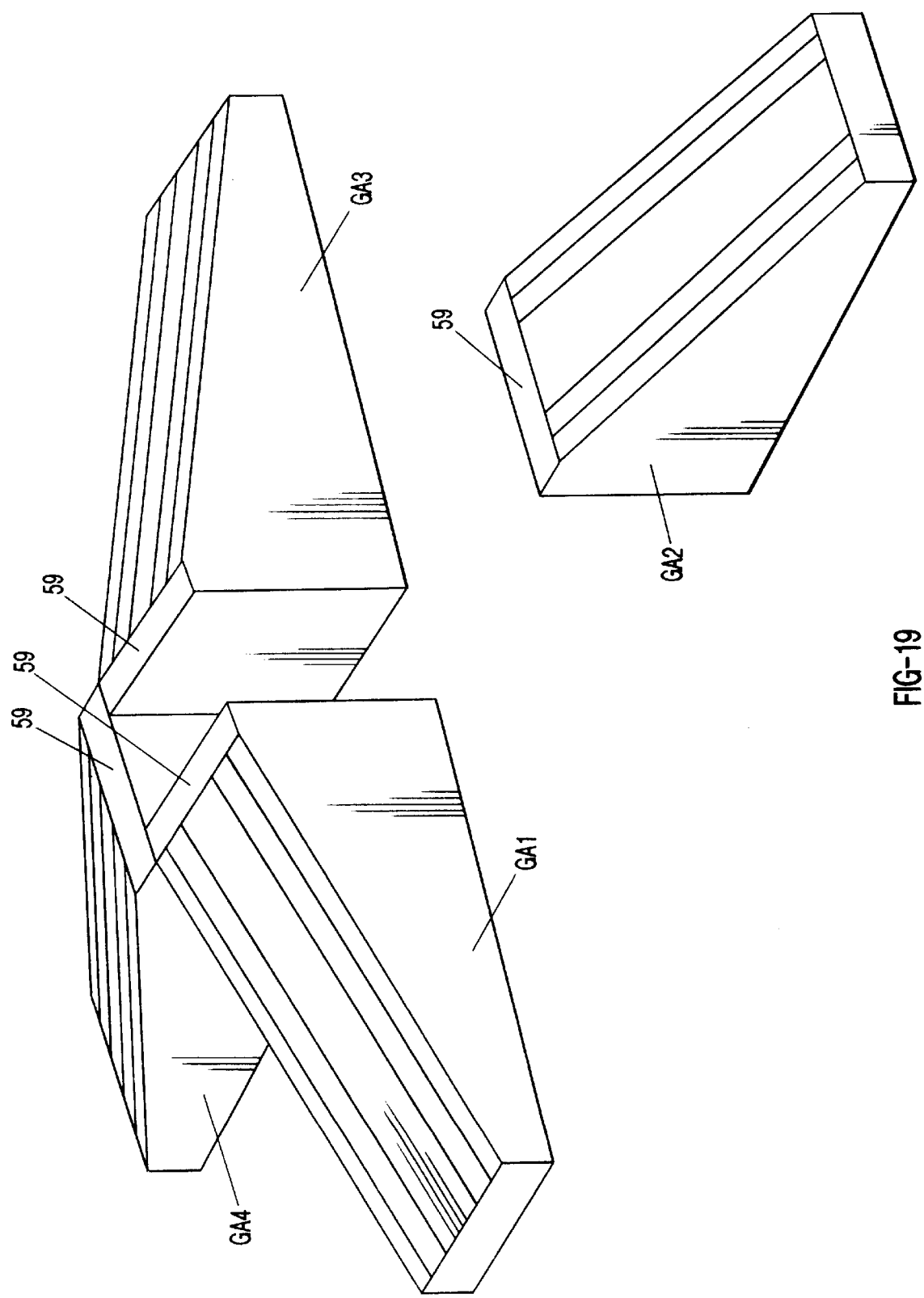

DEVICE FOR MOVING A BODY IN SPACE

BACKGROUND OF THE INVENTION

The present invention relates to an arrangement for moving a body in a three dimensional space, wherein the body is pivotably connected to connecting arms which each have at least two degrees of freedom and are provided with at least one drive for controlling an active degree of freedom.

It is known to move the platforms of so-called octahedral machines with six telescopic legs. They allow the movement in six independent degrees of freedom. The telescopic legs are supported by ball-and-socket joints or universal joints and are driven by threaded spindles, planetary rolling spindles or linear direct drives. The drives are integrated for this purpose into the telescopic legs. The telescopic legs define a triangular area between their end points at the platform and a stationary frame part. The joints are arranged at the stationary frame such that the connecting lines, formed by the base line of the triangular areas, define a hexagon.

Six telescopic legs are needed for movement of a platform in six degrees of freedom only when per telescopic leg only one drive for one active degree of freedom is integrated. When, for example, two drives for two active degrees of freedom are integrated per telescopic leg, the number of telescopic legs is reduced to three.

The end point of each telescopic leg is moveable in the three degrees of freedom X, Y, Z. Devices with rotatable but stationary base points and motorically displaceable, longitudinally adjustable legs or motorically adjustable base points and motorically longitudinally adjustable legs are know. In order to realize arrangements with less than six degrees of freedom for the platform, it has been suggested to use parallelogram arrangements for locking degrees of freedom as, for example, parallelograms for locking all orientational directions for stationary base points of the legs or also for position-adjustable base points in the form of hexa glides.

A feature of all known rod kinematic arrangements for machine-technological applications is the use of a platform as a tool carrier or work piece carrier.

In addition to the advantage of a mass-reduced movement apparatus, which is especially suitable for high accelerations, this arrangement however has considerable disadvantages. The ability for orientational changes is limited for hexapod devices in general to less than 30° because for greater orientational changes the legs will obstruct one another. The plurality of joints in each system results in a plurality of non-linear yielding positions which can only be linearly aligned by providing a respective prestress. Due to the geometric arrangement, this prestress cannot be provided by the connecting arms themselves, but only with prestress of each individual bearing.

It is therefore an object of the present invention to embody the device of the aforementioned kind such that, while providing high precision, a greater angle is possible for orientational changes.

SUMMARY OF THE INVENTION

A device for moving a rod body in space according to the present invention is primarily characterized by:
 a frame;
 connecting arms connected to the frame and having at least two degrees of freedom, wherein a rod body is pivotably connected to the connecting arms;
 at least one drive connected to each one of the connecting arms for controlling an active degree of freedom of the at least two degrees of freedom;
 wherein the rod body has a first end point and a second end point and wherein the first end point defines a spacial position within the space and wherein the first and second end points together define an orientation of the rod body in the space;
 the connecting arms serve to control the first and second end points.

The rod body may have any desired dimension and shaping.

Preferably, the connecting arms have three degrees of freedom and each connecting arm has a base point for connecting the connecting arm to the frame.

The base point is preferably a joint selected from the group consisting of a rotatable joint for allowing rotation, a sliding joint for allowing translatory movement, and a rotatable sliding joint for allowing rotation and translatory movement.

Preferably, the connecting arms each have an end opposite the base point. The connecting arms define connecting arm assemblies, wherein in each one of the connecting arm assemblies the ends of the connecting arm are guided to a common point.

Each connecting arm assembly comprises two of the connecting arms, wherein the base points are sliding joints and wherein the connecting arms form a pantograph.

The device especially further comprises a connecting element for connecting the first and second end points.

The connecting element has preferably an adjustable length for adjusting a distance between the first and second end points.

Advantageously, by changing the length of the connecting element, the connecting arms are tensioned.

The connecting element projects preferably past one of the first and second end points and ends in a rotation point.

The device may also comprise an axis pivotable about the rotation point.

Expediently, one end of the axis is pivotably connected to at least one of the connecting arms provided with one of the sliding joints for translatory movement.

By adjusting the distance between the first and second end points, the orientation of the rod body is changed.

The connecting arms are preferably connected to the first and the second end point and define a part of a parallelogram Preferably, first ones of the connecting arms are connected to the first end point and second ones of the connecting arms are connected to the second end point. The second connecting arms are mirror-symmetrically arranged relative to the first connecting arms.

The device may further comprise a connecting element for connecting the first and second end points. At least one of the connecting arms has an adjustable length for adjusting the orientation of the connecting element.

The device advantageously further comprises a connecting element for connecting the first and second end points and further comprises a fixed base plate and a guide, wherein the connecting element is guided in the guide relative to the base plate such that upon an orientational change of the connecting element the position of the first end point remains unchanged.

The guide has the shape of an arc extending concentrically to the first end point.

The connecting element comprises at least one guiding element and the at least one guiding element is connected to the guide.

The guide is rotatable by an angle $\alpha$ about a radial line of the arc.

The device may further comprise a connecting element for connecting the first and second end points and may further comprise a first plate having a defined orientation and defined position and second plate having a defined orientation and a defined position, wherein the first end point is located within the first plate, wherein the second end point is located within the second plate, and wherein the orientation of the connecting element is adjustable by the first and second plates.

The device may also comprise bearing elements, wherein the connecting element is connected to the first and second plates by the bearing elements.

The bearing elements are movable relative to one another in parallel planes.

The connecting element may have a variable length and the variable length provides an additional degree of freedom for the first end point.

Advantageously, the device comprises a drive for each one of the bearing elements for position-adjusting the bearing elements. The drive is preferably selected from the group consisting of a scissor drive and a pantograph drive.

The drives are mechanically (fixedly) coupled to one another.

Preferably, two of the drives are provided and the two drives are translatory drives. The translatory drives are combined such that one of the two drives supports the other of the two drives.

The device may further comprise a connecting element for connecting the first and second end points wherein the other of the two drives defines the second end point and is used for adjusting the orientation of the rod body.

The device may comprise a connecting element for connecting the first and second end points, wherein the connecting arms each have a base point for connecting the connecting arms to the frame. Two of the drives are provided and the two drives are translatory drives. The translatory drives are combined to form a common drive receiving two of the base points. The connecting arms are arranged so as to define part of a parallelogram or part of a triangle for locking at least one degree of freedom of the connecting element.

The device comprising a connecting element for connecting the first and second end points may be designed such that a rotation of the connecting element about the longitudinal axis is blocked by two of the connecting arms.

The connecting arms may be parallel to one another so as to act as a parallelogram and to thereby define a locking axis.

The connecting arms are pivotably connected to the rod body and have ends remote from the rod body joining in a common point. The connecting arms thus define together with the rod body a triangle with a locking axis.

The connecting arms define scissor kinematic arrangements positioned mirror-symmetrically to one another.

The connecting arms define four rod kinematic arrangements mirror-symmetrically arranged to one another such that the rod body is pivotably connected to the at least one drive.

The connecting arms of each one of the rod kinematic arrangements projects from a driving plane of the rod kinematic arrangement. Preferably, in each one of the rod kinematic arrangements the connecting arms diverge from a connecting point at a correlated one of the at least one drive.

The frame is comprised of frame modules and the frame modules preferably consist of polymer concrete.

In the inventive device the body is rod-shaped. One of its end points serves for positioning the rod body in the space. The other end point of the rod body determines, in conjunction with the first end point, the orientation of the rod body in the space. Both end points of the rod body are adjustable by the connecting arms.

BRIEF DESCRIPTION OF THE DRAWINGS

The object and advantages of the present invention will appear more clearly from the following specification in conjunction with the accompanying drawings, in which:

FIGS. 12a to 12d show in a respective schematic representation further embodiments of the inventive devices;

FIG. 12e shows a practical embodiment of the device according to FIG. 12a;

FIG. 18 and FIG. 19 show frame modules for designing the frame of the inventive device.

DESCRIPTION OF THE PREFERRED EMBODIMENTS

With the devices disclosed in the following, it is possible to design spatial kinematic machine arrangements for moving a body with a maximum of six degrees of freedom within a three-dimensional space. The body can be a tool carrier or work piece carrier of a machine tool. The body is preferably rod-shaped and is defined in regard to position and orientation by two end points. The distance between the end points is determined by a connecting element. The end points can be individually positioned within the three-dimensional space by the connecting arms. The kinematic arrangements have each three degrees of freedom. The complete drive system can be comprised of two or more kinematic arrangements each with three degrees of freedom. These kinematic arrangements in the following will be called kinematic base system. The degree of freedom can be passive, i.e., it can be formed by a rotational joint or sliding joint. The degree of freedom can also be active, i.e., it can be realized with a motorically driven rotational joint or sliding joint. Each of the kinematic base system is provided with at least one active joint and at least one connecting arm.

Figure 2:
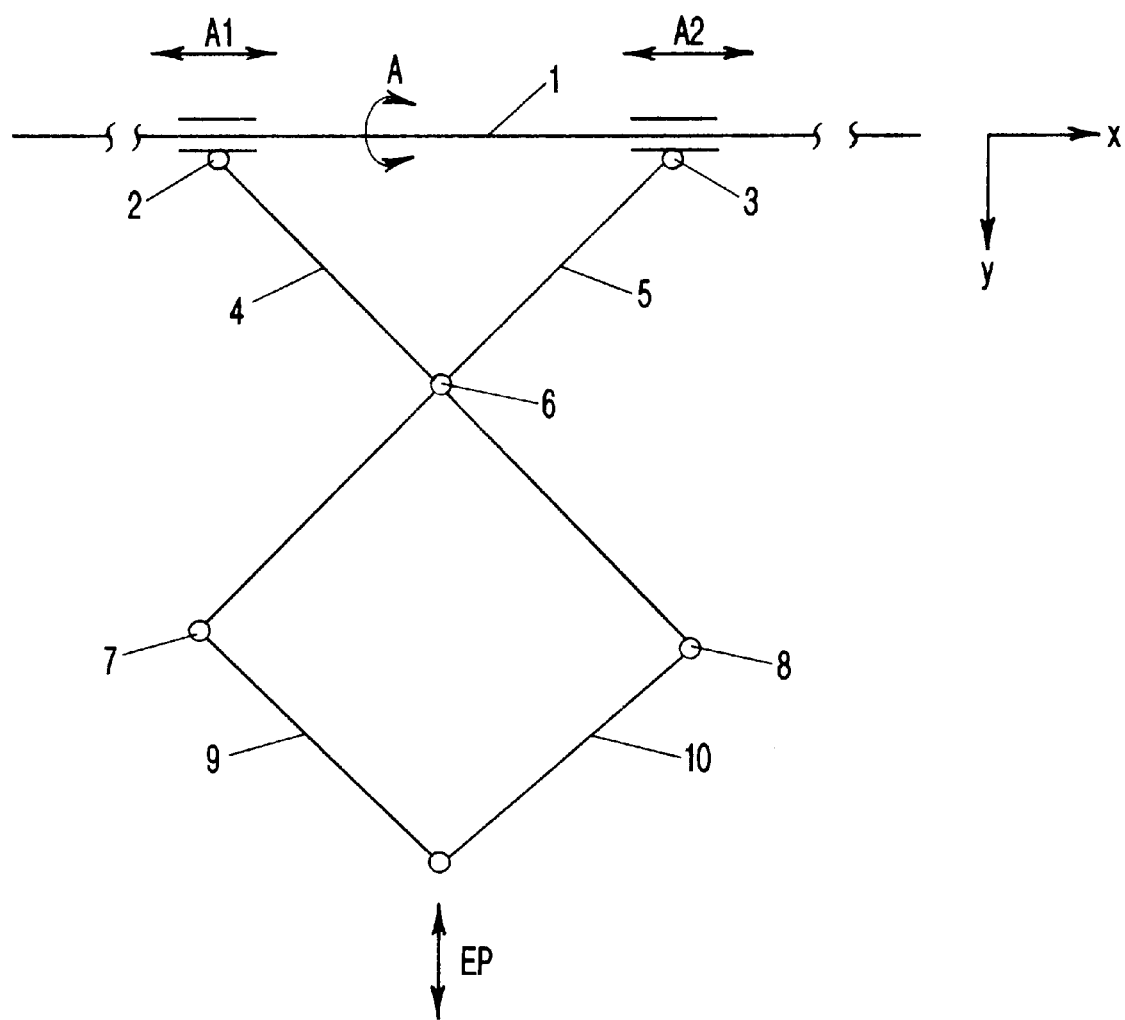
FIG. 2 shows in a schematic representation the basic kinematic arrangement of the inventive device embodied as a pantograph.

FIG. 2 shows a kinematic base system which is realized with a pantograph structure. It comprises two connecting arms 4, 5 which in the central area between their ends are pivotably connected by a joint 6. One end (base point) of the connecting arms 4, 5 is pivotably connected with rotational joints 2, 3 to the linear drive A1, A2. They are displacably supported on a linear guide 1. The ends facing away from the linear drives A1, A2 are connected with further joints 7, 8 to the ends of further arms 9, 10. The opposite ends thereof are pivotably connected to one another at the end point EP.

When the linear drives A1, A2 are synchronously moved in the same direction along the linear guide 1, the end point EP is displaced parallel to the movement path. When the two linear drives A1, A2 are displaced synchronously in opposite directions, the end point EP moves perpendicular to the linear guide 1. The linear drives A1 A2 can also be controlled such that the movement of the two individual drives overlap so that the end point EP can be moved along any desirable path within the respective plane. The position of the joint 6 determines the lever ratio of the connecting arms 4, 5 so that in a simple manner the lever ratio can be adapted to the respective individual application.

An important advantage of this scissor (pantograph) kinematic arrangement is that it is possible to employ a respective guide pair, i.e., a measuring system and a base frame, for both drive units A1, A2. Thus, the costs for assembly, alignment and operation can be reduced.

The scissor kinematic arrangement is provided with a further rotational degree of freedom A so that a kinematic base system results which has three degrees of freedom. Thus, the end point EP can assume any point within the three-dimensional space. The rotation A can be realized with an active or passive joint. Such a kinematic base system is supplemented with a further kinematic base system via end point EP.

Figure 1:
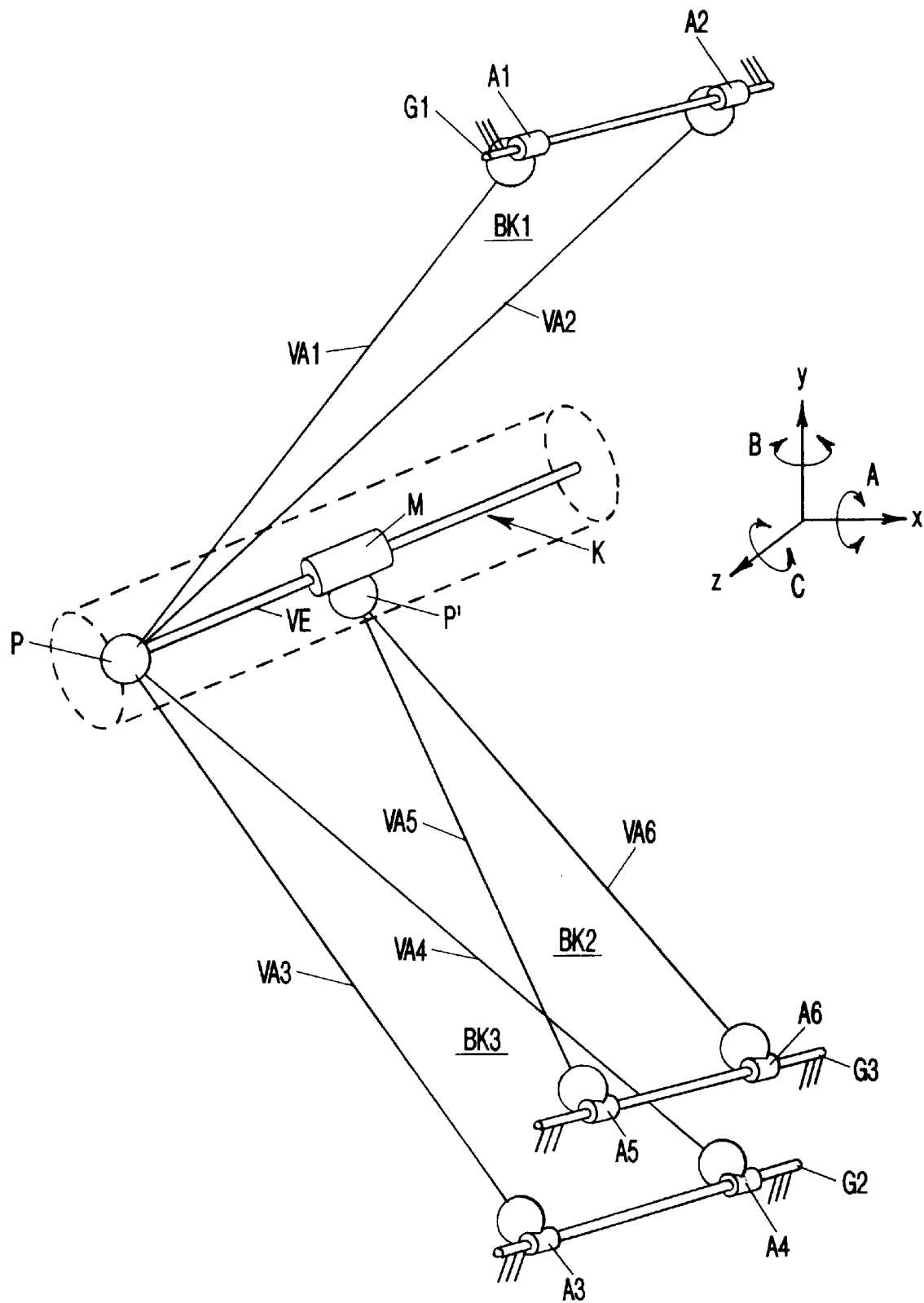
FIG. 1 shows in a schematic representation the inventive device.

The device according to FIG. 1 has linear guides G1 to G3 which extend parallel to one another. The linear guides G1 to G3 may be frame tracks and are components of the three kinematic base systems BK1 to BK3 which are of identical construction. Two linear drives A1, A2; A3, A4; A5, A6 are respectively movable on the linear guides G1 to G3. These linear drives together with the linear guides are components of the three kinematic base systems BK1 to BK3. They each comprise two connecting arms VA1, VA2; VA3, VA4; VA5, VA6. The arms VA1, VA2 of the kinematic base system BK1 are connected with one end to the end point P. Also, the ends of the other connecting arms VA3, VA4 of the kinematic base system BK3 are connected to the end point P. The other ends (base points) of these connecting arms VA1, VA2, VA3, VA4 are pivotably connected to the linear drives A1, A2; A3, A4 which are displaceable along the linear guides G1, G2. The connecting arms VA5, VA6 of the kinematic base system BK2 are pivotably connected with one end to the point of definition (reference point) P' and with their other end (base point) to the linear drives A5, A6. The reference point P' is provided at a drive M which is connected with a connecting element VE to the end point P. The two kinematic base systems BK2 and BK3 are positioned on one side and the kinematic base system BK1 on the other side of the connecting element VE. The distance between the two points P and P' can be changed with motor M.

The linear drives A1 to A6 are displaceable on the linear guides G1 to G3 extending in the direction of the X-axis and can be rotated about their axes. The linear guides G2 and G3 have only a minimal distance to one another. The three kinematic base systems BK1 to BK3 are embodied as single scissor arrangements which comprise the linear drives A1 to A6 and the corresponding frame-mounted linear guides G1 to G3. The two points of connection P and P' as well as the connecting element VE define a rod-shaped body K which may be a tool carrier or work piece carrier. The linear drives A1 to A6 are displaceable along the linear guides G1 to G3 and are also rotatable about their axes. With a corresponding control of the linear drives A1 to A6, the body K can be adjusted in any desired spatial position. With the linear drives A1 to A6 the body K can be controlled in a defined manner relative to the three axial coordinates X, Y, Z as well as their orientation A, B, C.

Since the point P' is provided at the drive M, the distance between the two points P and P' of the body K can be varied by the motor. With such distance changes between the two points P and P', an additional degree of freedom for changes of the kinematic system characteristics are provided. The drive M can be a linear drive or a spindle-nut drive. The motor may be an electric, hydraulic, pneumatic motor etc.

With the linear drives A1 to A4 the point P can be displaced as desired within the working space by the connecting arms VA1 to VA4 the base points of which are stationarily connected via the drives A1 to A4 on the linear drives G1 and G2. With the aid of the connecting arms VA5, VA6, the base points of which are stationarely arranged on the linear guides G3 via the drives A5, A6, the point P' can be displaced within the space so that the orientation of the connecting element VE and thus of the rod body K can be changed in regard to two degrees of freedom. The third orientational degree of freedom remains undefined and must thus be secured with a rotational fixation as will be explained in connection with FIGS. 14 and 15. With the motor M the distance between the two point P and P' can be changed so that a further degree of freedom for affecting the orientation of the body K within the space is provided.

For determining the point P the connecting arms VA1, VA2, and VA3 are sufficient. The connecting arm VA4 results in a symmetric arrangement and may be advantageous in some situations for load considerations (static, dynamic loads). Furthermore, the arrangement of the triangular kinematic base system BK1 and BK3 allows the use of a pantograph (double scissor) arrangements according to FIG. 2 in order to shorten the displacement path for the drives A1, A2 along the Y-axis. Instead of the pantograph arrangement it is also possible to use a multiple scissor arrangement in the aforedescribed device.

Figure 3:
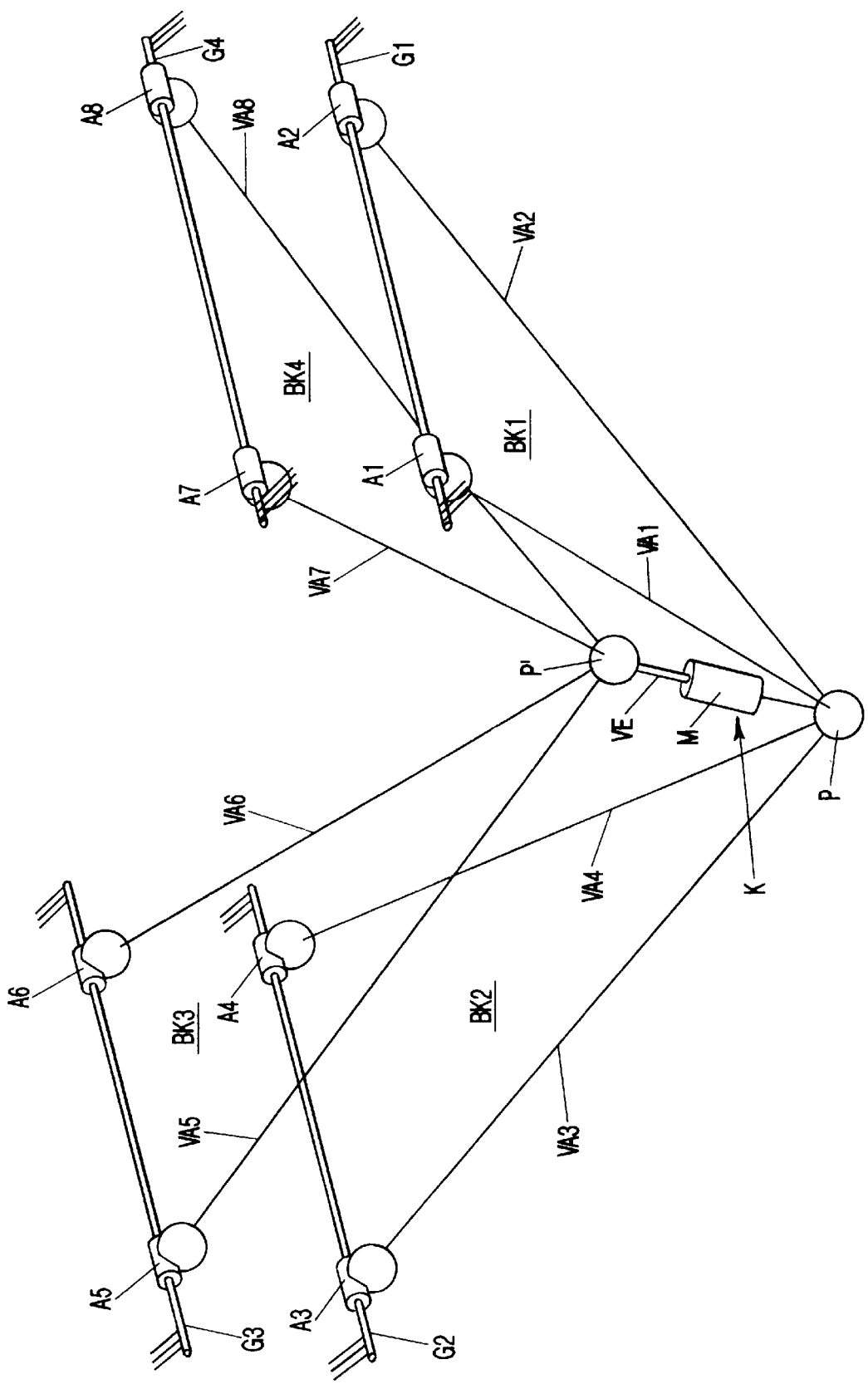
FIG. 3 to FIG. 10 show in schematic representations further embodiments of the inventive device.

When the end point P' is guided independent of point P and independent of the connecting element VE in three degrees of freedom, i.e., exactly in the same manner as the point P two fixed spatial points P and P' result which can be prestressed with the length-adjustable connecting element VE. Such an arrangement is shown in FIG. 3. The length adjustment of the connecting element VE is carried out with the aid of the motor M. In this embodiment with the additional guide G4 and the sequential arrangement of two identical systems with the linear guides G1, G2, G3, G4 an advantageous symmetric arrangement is provided. The device has thus four kinematic base systems BK1 to BK4. The frame-mounted linear guides G1 to G4 extend in the direction of the Z-axis. Two linear drives (A1 to A8) are seated respectively on each one of the linear guides. The connecting arms VA1, VA2 of the kinematic base system BK1 are connected to the point P of the body K. The ends of the connecting arms VA3, VA4 of the kinematic base system BK2 are connected to the point P. The connecting arms VA5, VA5 and VA7, VA8 of the two other kinematic base systems BK3 and BK4 are connected to the point P'. This end point P' is connected with the connecting element VE to the end point P. With the drive M the distance between the two end points P, P' of the body K can be varied. The linear drive A1 to A8 are displaceable along the linear guides G1 to G4 and are rotatable about their axes. Thus, the rod body K can be controlled by individual control of the drives A1 to A6 in regard to the three axes X, Y, Z as well as in the rotational directions A, B, C. With control-technological measures the end point P' can be adjusted such that the arms of the kinematic base systems BK1 and BK2 can be tensile-loaded and the arms of the kinematic base systems BK3 an BK4 can be pressure-loaded in order to generate a prestress within the entire system.

It also possible to sequentially arrange the linear guides G1, G2 and G3, G4; the basic operational principle of this device will not change.

For prestressing all of the connecting arms VA1 to VA8 only a single prestressing element M is required.

In the disclosed embodiments the kinematic base systems are embodied as simple scissor arrangements. In principle, the kinematic base system can also be formed by double scissor arrangements (pantograph arrangements) as shown in FIG. 2. This is also true for the embodiments disclosed in the following.

It is also possible to provide any desired combination of kinematic base systems based on spherical or cylindrical coordinate systems.

Due to the plurality of degrees of freedom by providing multiple coordinated kinematic base systems with three degrees of freedom, which are only partially controllable, combinations result in which the body K, respectively, its point P is not defined with regard to all degrees of freedom, i.e., is not controllable. These undefined degrees of freedom must be locked by constructive solutions.

Figure 4:
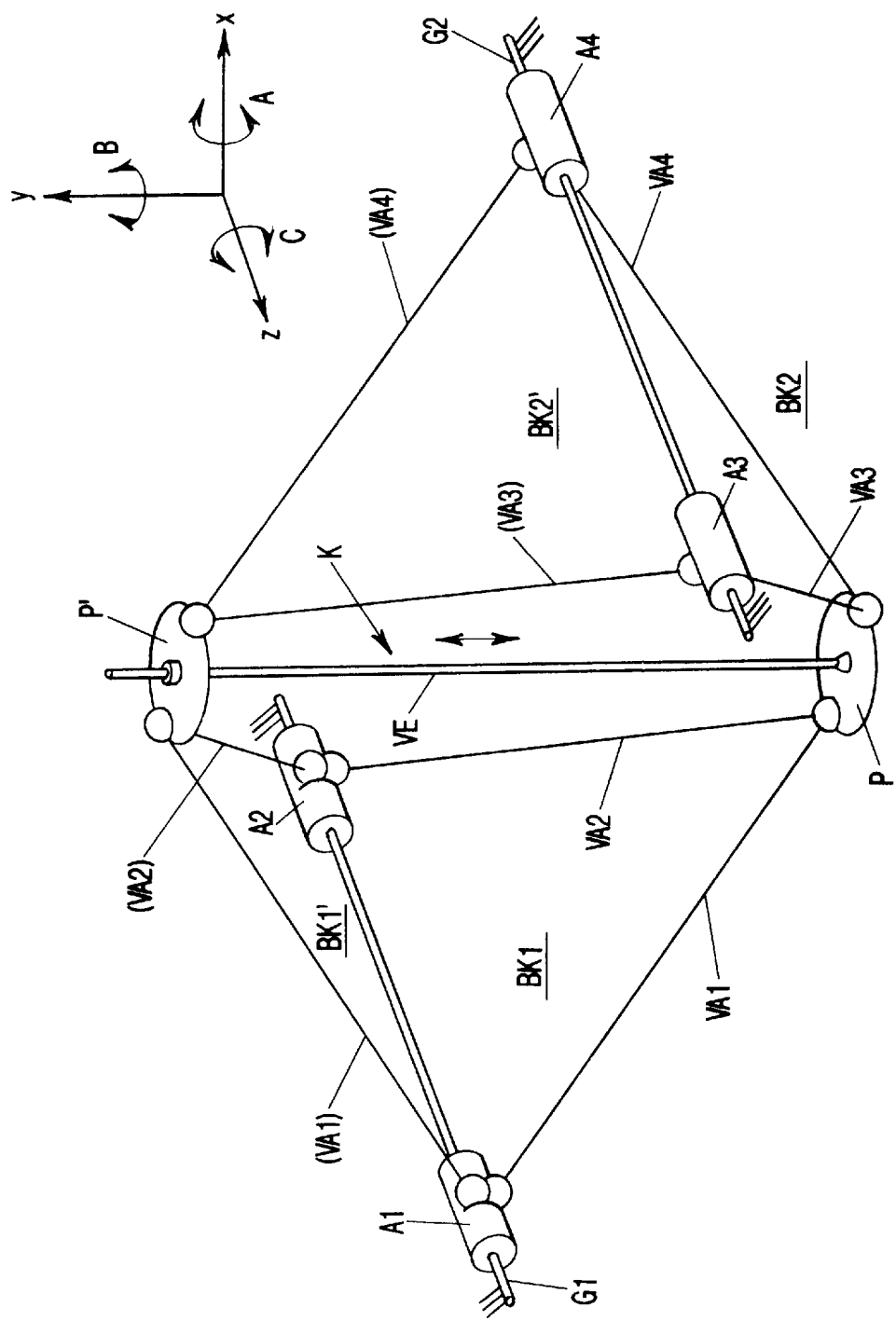

FIG. 4 shows an embodiment with four kinematic base systems BK1, BK1' and BK2, BK2'. The device has two linear guides G1 and G2 on which two linear drives A1, A2 and A3, A4 are displacably arranged, respectively. The linear drives A1, A2 are pivotably connected with connecting arms VA1, VA2 to the end point P and by further arms (VA1), (VA2), mirror-symmetrically arranged to the arms VA1, VA2, to the further end point P' of the body K. In the same manner, the linear drives A3, A4 are pivotably connected via arms VA3, VA4 to the end point P and via arms (VA3), (VA4) to the end point P'. The connecting element VE is fixedly connected to the point P while the point P' is arranged on the connecting element VE so as to be displaceable in its longitudinal direction. Each frame-mounted linear guide G1, G2 has coordinated therewith in the aforementioned manner two kinematic base systems BK1, BK1' and BK2, BK2' which are embodied as single scissor arrangements. By controlling the linear drives A1 to A4, the point P' can be slidably controlled relative to the point P along the connecting element VE. A rotation in the direction A, B is prevented. Only a rotation about the Z-axis in the direction C is possible. In this embodiment, the end point P of the body K determines the position in space, while the other end point P' in connection with the first point P determines the spatial orientation of the body K. As in the previous embodiments the connecting arms serve for adjusting the two points P, P'.

Figure 5:
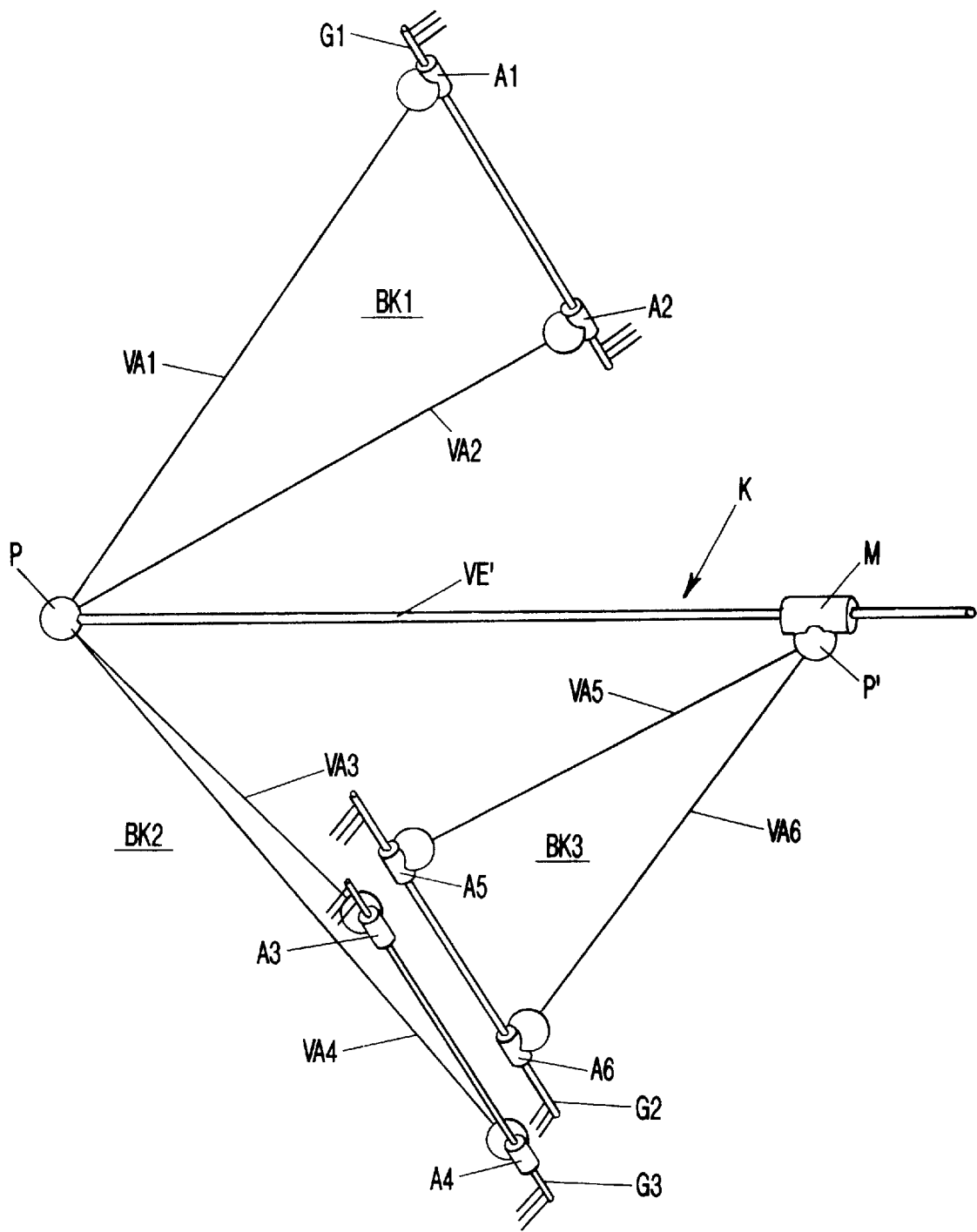

In the embodiment according to FIG. 5, three frame-mounted linear guides G1 to G3 are provided on which two linear drives (A1 to A6) are slidably supported, respectively. The linear drives A1, A2 are pivotably connected by connecting arms VA1, VA2 to the end point P of the body K. The linear drives A3, A4 are also pivotably connected by connecting arms VA3, VA4 to the end point P. The linear drives A5, A6 are connected pivotally by connecting arms VA5, VA6 to the end point P' of the body K. The end point P' is provided at the drive M which is displacable along the connecting element VE'. With the drive M the distance between the two points P and P' can be actively changed. Due to the motorical adjustment of the length of the connecting element VE', a change of the orientation of the body K is possible. The connecting arms of the kinematic base systems BK1 to BK3 can be tensioned by changing the distance between the points P and P'.

Figure 6:
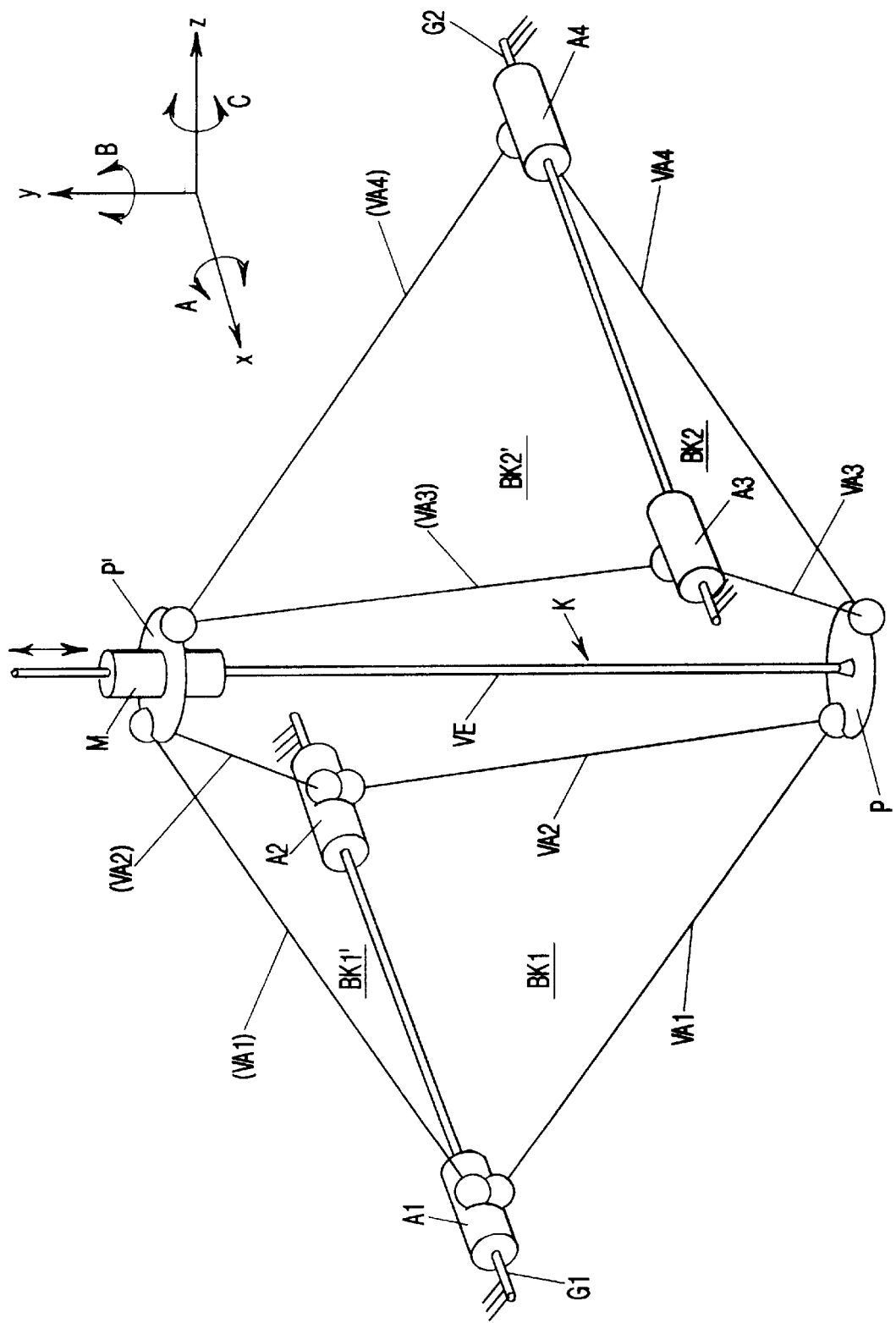

The device according to FIG. 6 has four kinematic base systems BK1, BK1' and BK2, BK2' which are also embodied by single scissor arrangements. The kinematic base systems BK1 and BK1', respectively, BK2, BK2' are arranged mirror-symmetrically relative to the X-axis of the linear guides G1, G2. The device is embodied such that the rotational axes B, C are blocked. The connecting arms, VA1, VA2 of the kinematic base system BK1 connect the linear drives A1, A2 in a pivotable manner to the point P of the body K. The connecting arms (VA1), (VA2) of the mirror-symmetrically arranged kinematic base system BK1' connect the linear drives A1, A2 pivotably to the point P' of the body K. In the same manner, the connecting arms VA3, VA4 of the kinematic base system BK2, respectively, the connecting arms (VA3), (VA4) of the kinematic base system BK2' is pivotably connected to the linear drives A3, A4 and the point P, respectively, the point P'. Two linear drives A1, A2 and A3, A4 are respectively displaceable along the frame-mounted linear guides G1 and G2. The point P is connected with the connecting element VE with the point P'. The connecting element VE is fixedly connected with one end to the point P, while the point P' is displaceable in the longitudinal direction on the connecting element VE. The end point P' is provided at the drive M so that the end point P' can be actively displaced along the connecting element VE. By displacing the point P' with the drive M, all connecting arms of the kinematic base systems BK1, BK1', BK2, BK2' can be prestressed by a tensile load. The kinematic base systems BK1, BK1' and BK2, BK2' are arranged on opposite sides of the connecting element VE. At the body K, as in the previously disclosed embodiments, a corresponding tool or work piece is arranged. The kinematic base systems are again comprised of single scissor arrangements.

Figure 7:
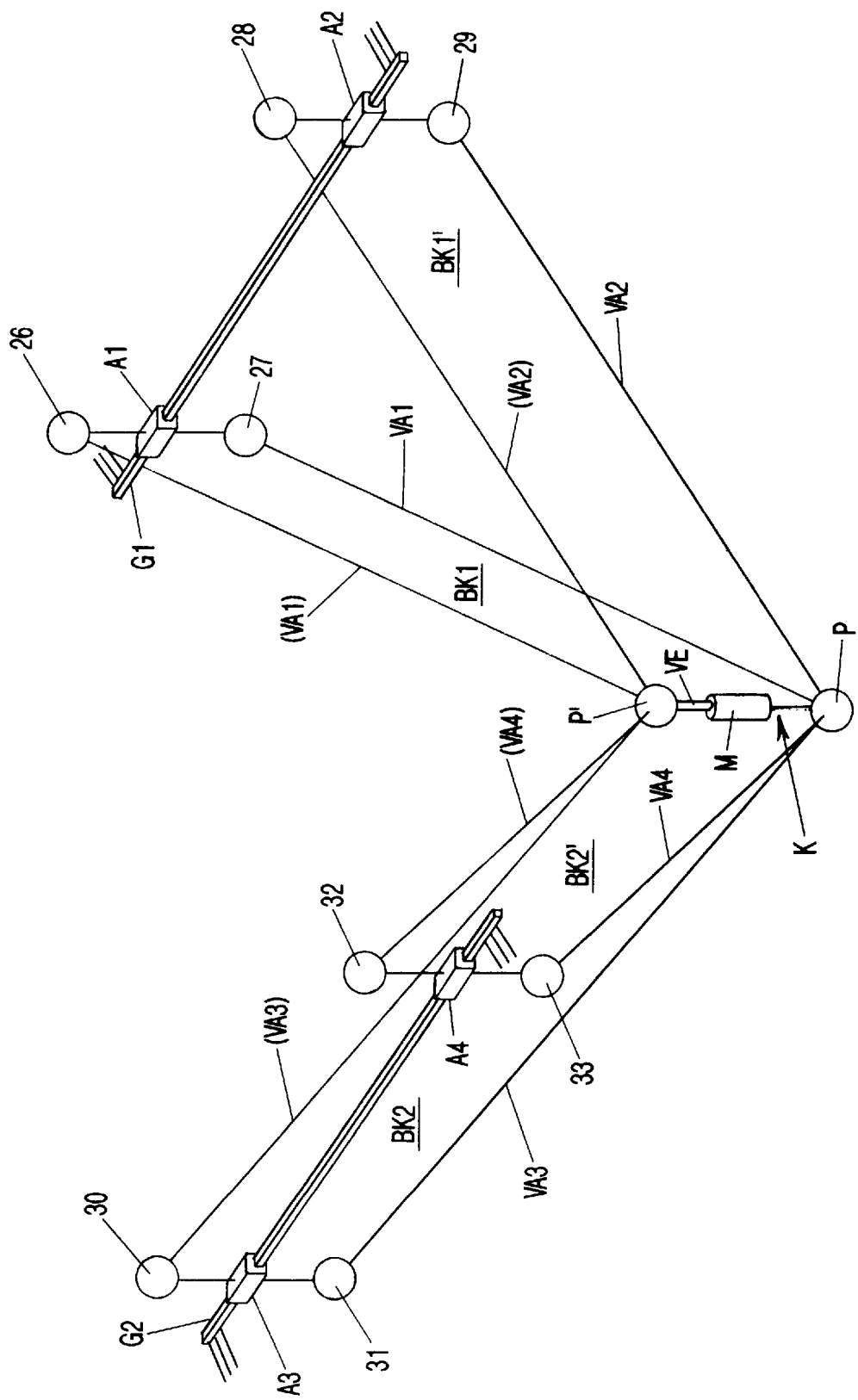

FIG. 7 shows an arrangement that comprises parallelogram arrangements as the kinematic base systems. With such parallelogram arrangements, degrees of freedom not defined by active joints can be locked. The device has two frame-mounted linear guides G1, G2 on which the linear drives A1, A2 and A3, A4 are diplaceable, respectively. The two linear guides G1, G2 extend in the direction of the Z-axis. Each linear drive A1 to A4 has coordinated therewith two pivot points 26, 27; 28, 29; 30, 31; 32, 33. The connecting arms VA1, (VA1) are connected with their base points to the pivot points 26, 27 of the linear drive A1 and the opposite ends are pivotably connected to the end points P, P' of the body K.

The connecting arms VA2, (VA2) are connected with one end to the joints 28, 29 of the linear drives A2 and the opposite ends are connected pivotably to the end points P and P'.

The two points P and P' are connected to one another by the connecting element VE the length of which can be adjusted by the drive M.

The point P' is pivotably connected via the connecting arms (VA3), (VA4) to the joints 30 and 32 of the linear drives A3 and A4. In the same manner, the end point P of the rod body K is pivotably connected via the connecting arms VA3, VA4 to the pivot points 31 and 33 of the linear drives A3 and A4. The linear guides G1 and G2 are positioned on opposite sides of the rod body K and are parallel to one another.

The connecting arms VA1, (VA1) are part of the kinematic base system BK1. In the same manner, the parallel extending arms VA2, (VA2); VA3, (VA3); VA4, (VA4) are respectively part of further kinematic base systems BK1', BK2, BK2'.

One side of the parallelogram-shaped kinematic base system is formed by the rod body K. The kinematic base systems form with their connecting elements a rod assembly that can be prestressed via the connecting element VE and the drive M which, for example, can be a pressure cylinder, such that the arms VA2 and VA4 are loaded by tension and the arms VA1 and VA3 are loaded by pressure, without exerting forces onto the linear drives A1 to A4. Via the prestress provided by the pressure cylinder within the connecting element VE, the stiffness of the system can be adjusted and the play of the bearings can be eliminated. The device can also be used for systems with five or more degrees of freedom. Due to the parallelogram arrangement a locking of the orientational degree of freedom while the option of joint prestressing is preserved.

Figure 8:
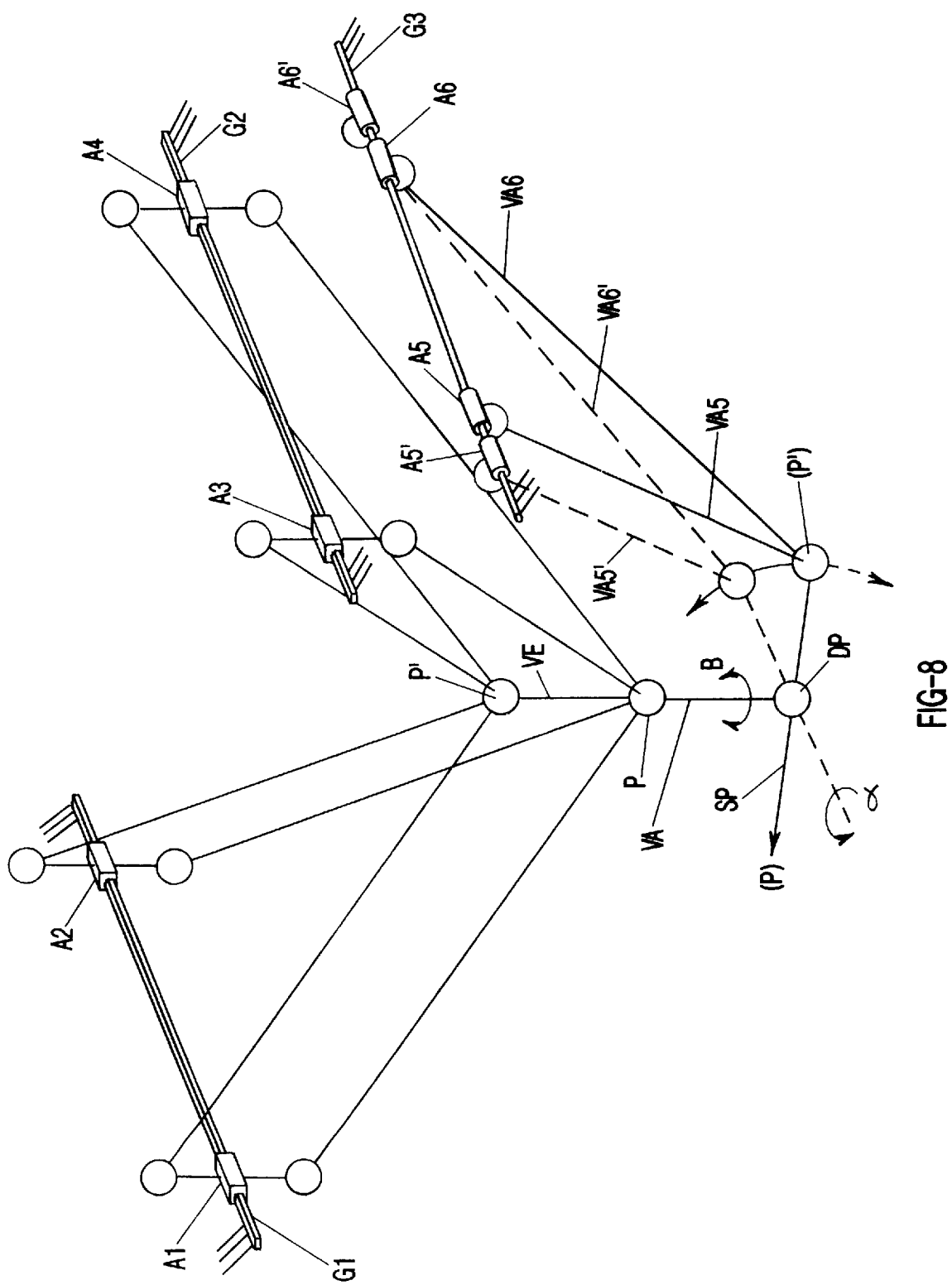

The device according to FIG. 8 difference from the device according to FIG. 7 in that the connecting element VE is extended outwardly by an element VA. It receives via a rotational joint DP a spindle element SP which can be pivoted about the rotational joint DP in the direction of the dashed double arrow. An end point (P') of the spindle element SP is pivotably connected with a scissor arrangement to linear drives A5, A6 which are displaceable on the frame-mounted linear guide G3. The connection is achieved with the connecting arms VA5, VA6. With solid lines a position of the end point (P') of the spindle element SP is represented. By displacing the linear drives A5, A6 opposite to one another into the positions A5' and A6' along with the linear guide G3, the end point (P') is pivoted in the direction of the dashed arrow about the rotational joint DP. In this pivoted position the connecting arms are in the position VA5', VA6'. The length of the connecting element VE, in deviation of the illustrated embodiment, can be adjusted by a drive as explained in the aforementioned embodiment. Otherwise, this embodiment is identical to the embodiment of FIG. 7.

The linear drives G1 through G3 extend parallel to one another. Via the connecting arms VA5, VA6 as well as their drives A5 and A6 the end point (P') of the spindle element SP can be changed in the afore described manner about the rotational point DP so that the orientation of the spindle element SP can be changed in two degrees of freedom α, β. With this adjustment of the spindle element SP, the linear drives A5, A6 are rotated about the axis of the linear guide G3.

Figure 9:
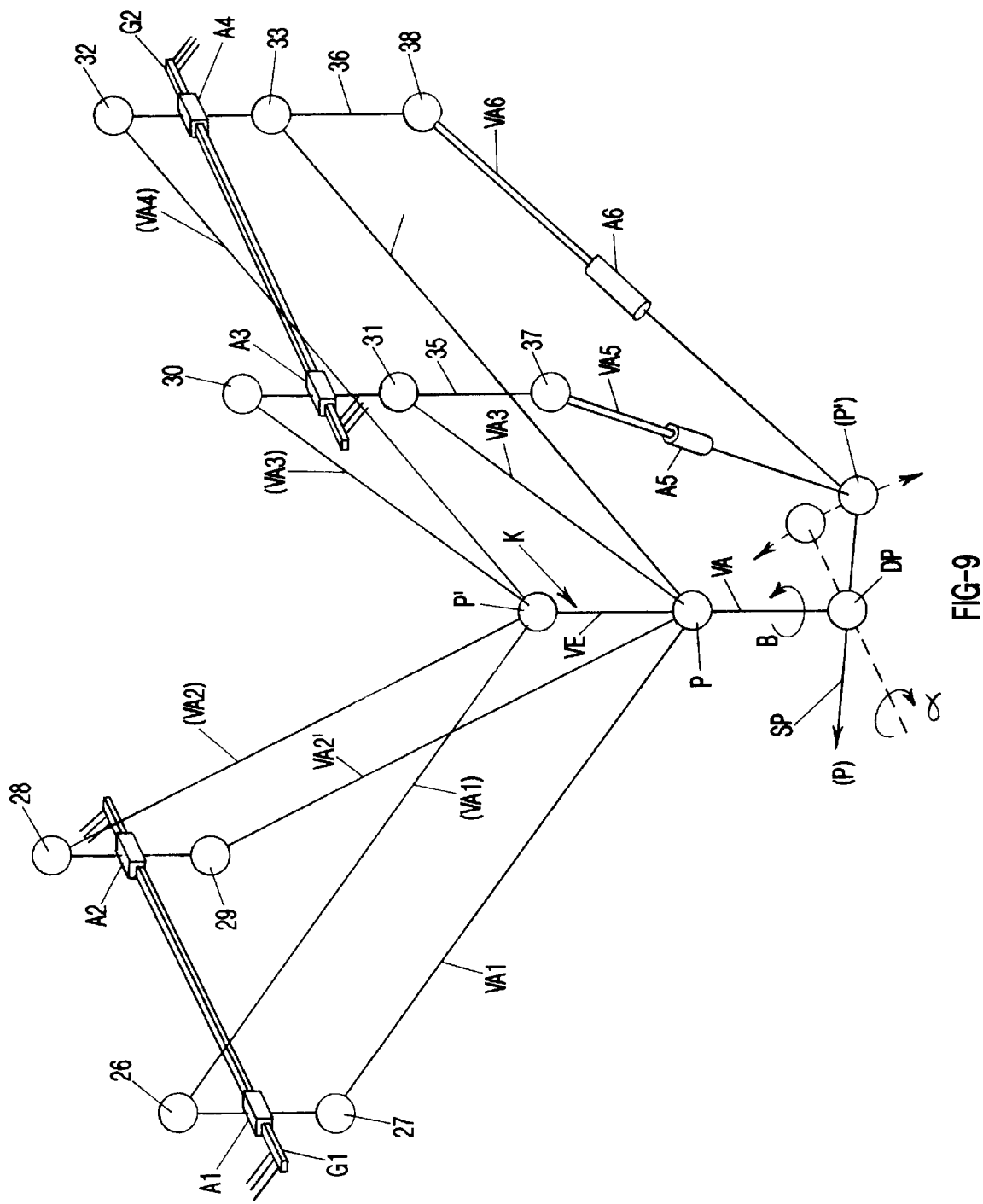

In the embodiment according to the FIG. 9 the connecting arms VA5, VA6 are displaceable in the longitudinal direction motorically by two drives A5, A6. By varying the arm length, the end point (P') of the spindle element SP can be adjusted in its orientation. The linear drives A1 to A4, which are arranged in pairs on the frame-mounted linear guides G1, G2, have pivot points 26 to 33. As in the embodiments according to FIGS. 7 and 8, each linear drive has coordinated therewith two pivot points which are arranged on opposite sides of the respective linear drive at a distance thereto. The rod body K has again the points P and P' which are connected to one another by the connecting element VE. The connecting arms VA1 to VA4 connect the joints 27, 29, 31, 33 in pivotable manner to the point P of the rod body K. The point P' of the body K is pivotably connected by connecting arms (VA1) to (VA4) to the joints 26, 28, 30, 32. The connecting arms are again part of parallelogram arrangement that have as a common parallelogram side the rod body K.

The pivot points 31 and 33 of the linear drives A3, A4 are pivotably connected by arms 35, 36 to the knots or junction points 37, 38. The knots 37, 38 are pivotably connected by the length-adjustable connecting arms VA5, VA6 to the end point (P') of the spindle element SP. As in the previous embodiment, the connecting element VE is extended by the element VA in the outward direction. By this element VA, the end point P is coupled to the rotational joint DP.

This device with the external position of the element VA and thus with an externally positioned point of rotation DP results in a very great spatial freedom for changing the orientation. The individual linear drives can be controlled independent of one another so that an optimal adjustment in space is ensured. The end point (P') of the spindle element SP is effected by the length adjustment of the connecting arms VA5, VA6 with the motors (drives) A5, A6. The base point of the connecting arms VA5, VA6 are pivotably, but stationarily connected to the drives A3, A4 of the positioning system for the connecting element VE. In FIG. 9 a rotated position of the spindle element is represented by a dashed line. This position can be achieved by a corresponding motoric length displacement of the connecting arms VA5, VA6.

Figure 10:
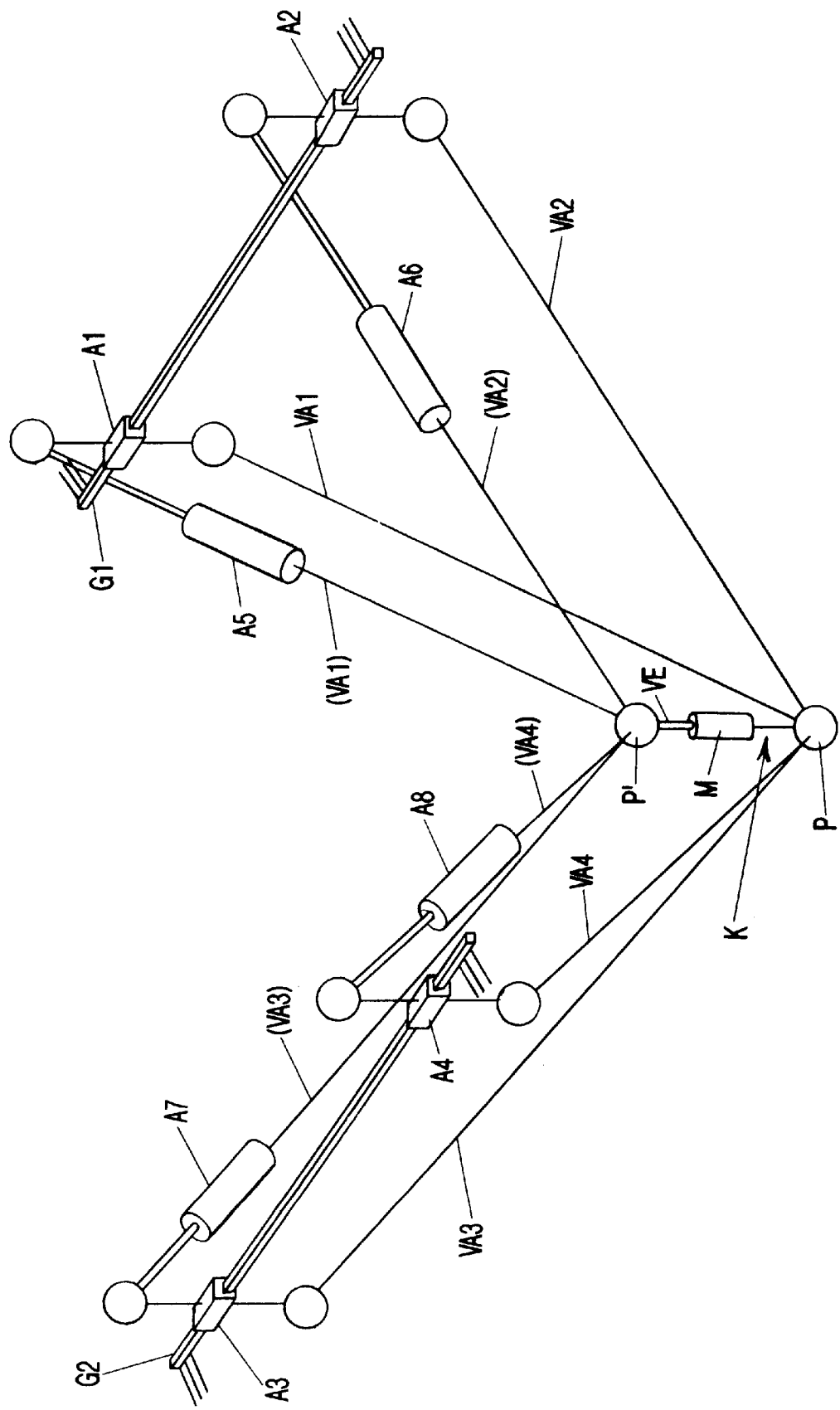

The device according to FIG. 10 corresponds essentially to the embodiment according to FIG. 7. It differs only in that the connecting arms (VA1) to (VA4) are length-adjustable by a respective motor A5 to A8. In order to be able to control the orientation of the connecting element VE of the rod body K in space, the point P' is adjusted in its spatial position with a corresponding length adjustment of these connecting arms (VA1) to (VA4). With the drive M of the rod body K, in the manner disclosed above, joint prestress can be achieved.

Figure 11:
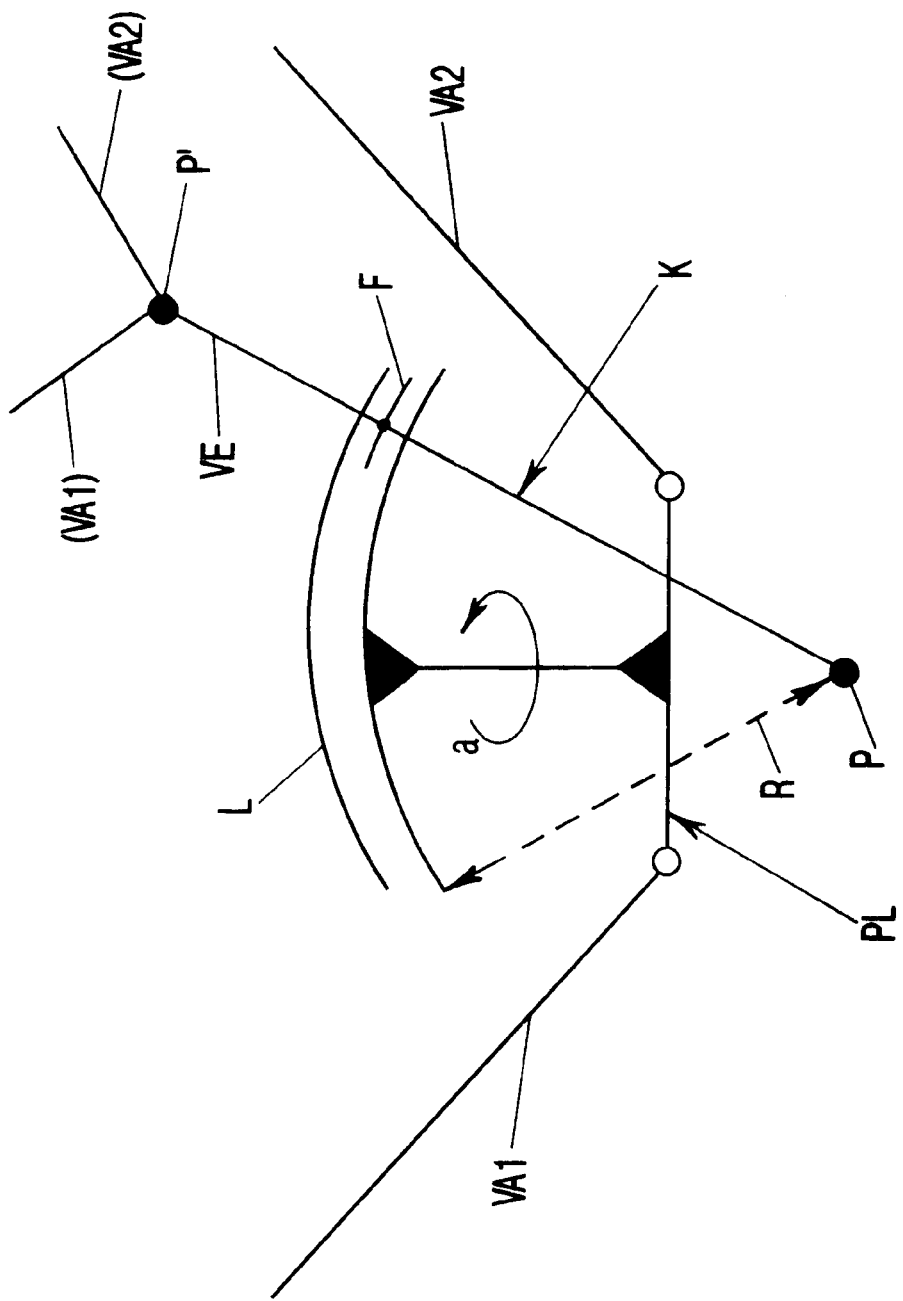
FIG. 11 shows in a schematic representation a portion of a further embodiment of the inventive device.

FIG. 11 shows an arrangement which, based on the special embodiment of the bearing L for guiding the connecting element VE of the rod body K, ensures that the end point P upon changing the orientation of the connecting element VE is not changed. For this purpose, the guide bearing L is embodied as an arc concentric to the point P and having a radius R. On the connecting element VE a guide element F is positioned that is displacable within the guide bearing L. Upon displacing the guide element F within the guide bearing L, the orientation of the connecting element VE is changed but not the position of the point P. The two end positions of the connecting element VE are represented with solid and dashed lines, respectively. The end point P' is adjusted with the connecting arm (VA1) and (VA2) according to the desired orientation. The body K is provided with a plate PL on which the guide bearing L is supported. The ends of the connecting arms VA1 and VA2 are pivotably connected to opposite locations at the plate PL. The plate PL and also the guide bearing L are thus positioned by the arms VA1, VA2. Furthermore, the guide bearing L can be rotated about an angle α.

FIG. 12a shows a device for changing the orientation of the connecting element VE with a positional change of two platforms (plates) PL1 and PL2. The plates PL1, PL2 are adjustable in their spatial position by connecting arms VA1, VA2 and (VA1), (VA2). Furthermore, the platforms PL1, PL2 are connected with the connecting element VE to the bearing locations L1, L2. The rod body K has two end points P, P'. One of the two bearing locations L1, L2 can also be maintained stationarily as long as the corresponding plate can be changed with the orientation angle in regard to its orientation. Due to the disclosed pivotable connection of the platforms PL1, PL2 by the bearings L1, L2 to the connecting element VE, the platforms PL1, PL2 will always remain parallel to one another.

Figure 12B:
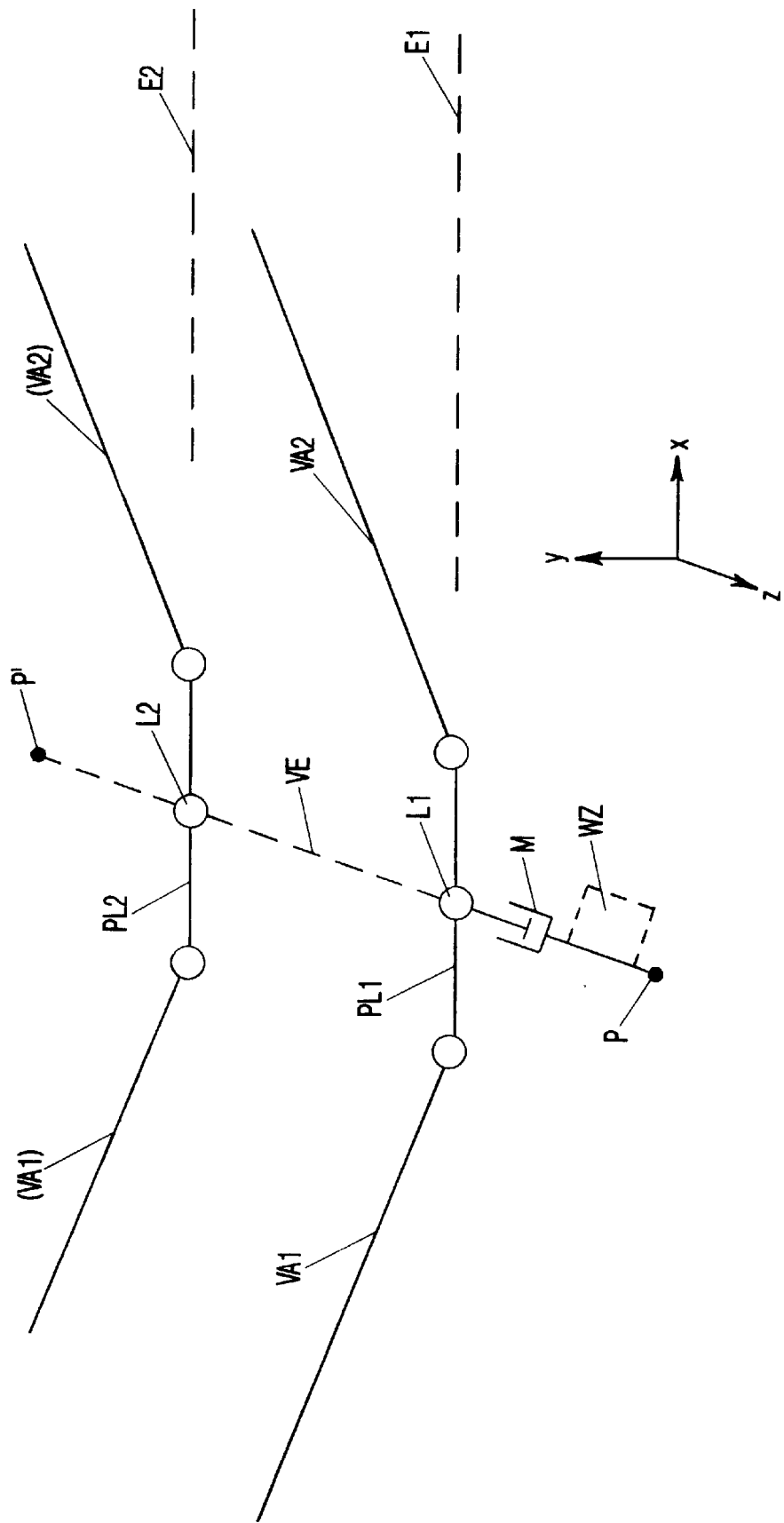

FIG. 12b shows an arrangement for changing the orientation of the connecting element VE, corresponding to the embodiment of FIG. 12, but with a locking function of the degree of freedom for the bearing locations L1, L2 in the direction of the Z-axis. Thus, the bearing locations L1, L2 can only be moved in a plane E1 or E2. The Z-axis is generated by a variable extension of the connecting element VE. For this purpose, a piston-cylinder arrangement is arranged within the connecting element VE to provide a drive M with which the length adjustment of the connecting element VE can be achieved. The platforms PL1 and PL2 are moved with the attached connecting arms VA1, VA2 and (VA1) (VA2) within the planes E1, E2. The position of the planes E1, E2 in the direction to the Z-axis is achieved by the corresponding length adjustment of the connecting element VE.

Figure 12C:
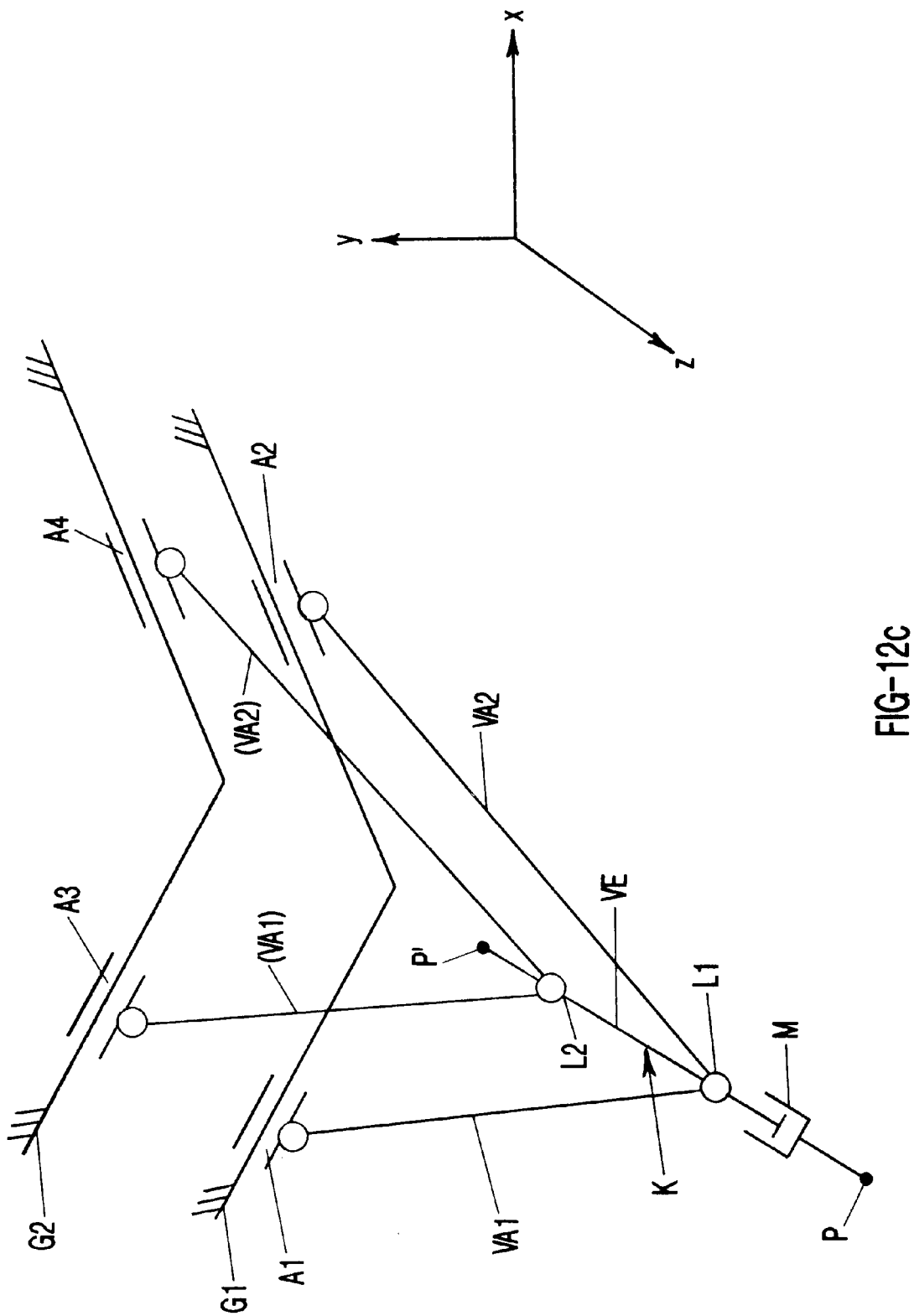

In the embodiment according to FIG. 12c, the platforms L1, L2 are pivotably connected according to the previous embodiment by the connecting arms VA1, VA2 and (VA1), (VA2) with the linear drives A1, A2, and A3, A4 on the frame-mounted linear guides G1, G2. The connecting element VE of the rod body K can thus be changed in the direction of the Z-axis by the drive M. The connecting arms VA1, VA2 and (VA1), (VA2) thus form a scissor arrangement with which the bearing position L1 and L2 can be positioned within the space. For this purpose, the linear drives A1 to A4 are displaced in a corresponding manner on the linear guides G1, G2. Thus, the orientation of the connecting element VE can be adjusted. The degree of freedom in the direction of the Z-axis is thus provided by the drive M. Instead of the represented simple scissor arrangement, it is also possible to provide a double scissor arrangement (pantograph) according to FIG. 2.

The device according to FIG. 12d corresponds substantially to the embodiment of FIG. 12c. It differs from the previous embodiment in that the two scissor arrangements are mechanically connected by connecting elements VF to form a single scissor system so that for the second scissor arrangement the linear drives A3, A4 are obsolete and replaced with the simple slides F1, F2. The driving action is thus provided by the linear drives A1, A2 whereby the slides F1, F2 are entrained on the linear guide G2 in a corresponding amount. For generating the degree of freedom in the direction of the Z-axis, the drive M is provided. Due to the mechanical coupling of the two scissor arrangements to a single scissor system, the two bearing locations are also combined to a single bearing location L1. The orientation of the connecting element VE during displacement of the linear drives A1, A2 remains constant (unchanged). Thus, this arrangement has only three degrees of freedom.

FIG. 12e shows a practical embodiment of the embodiment according to FIG. 12a. The represented device has a machine frame 39 with frame surfaces 40 and 41 that extend at an oblique angle to one another. They are provided with linear guides G1, to G4 along which the linear drives A1 to A4 are displaceable. The ends (base points) of the connecting arms VA1 to VA4 are connected to the linear drives A1 to A4 and the opposite ends are spherically pivotably connected to the platform PL1 and PL2. The connecting arms VA1 to VA4 are pivotable at the drive side only about two parallel axes so that the connecting arms can only be adjusted in a plane that is perpendicular to the pivot axis. The platforms (plates) PL1, PL2 are components of the rod body K which has an adjustable unit 42 that is adjustable perpendicular to the pivot plane of the connecting arms VA1 to VA4.

At one side wall of the machine frame 39 two tool magazines 43, 44 are provided adjacent to one another which are rotatable about parallel horizontal axis and which are provided with respective tools. The tools are changed with a tool changing device 45 into the unit 42.

Figure 13:
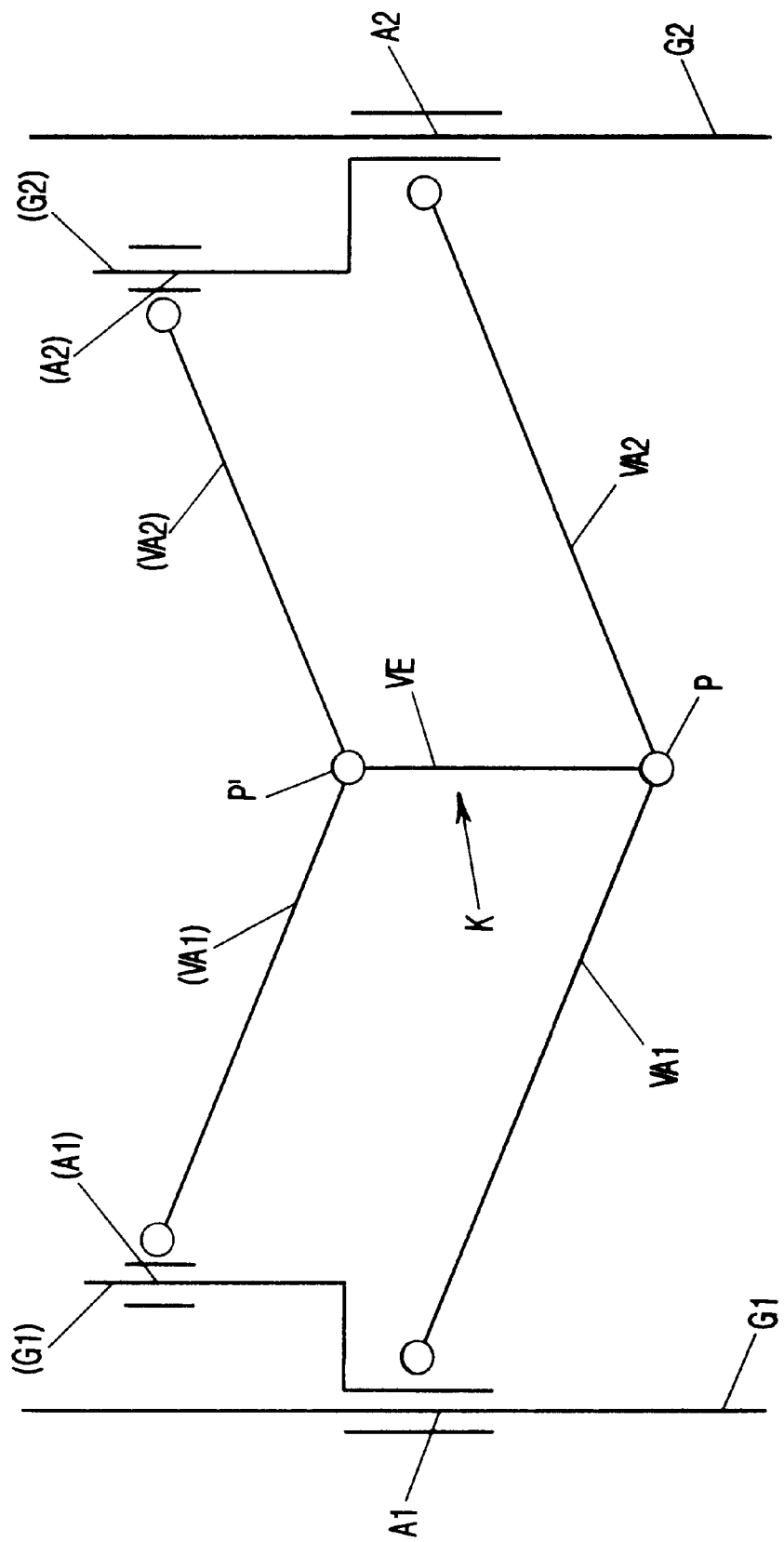
FIGS. 13 to 15 show in a schematic representation further embodiments of the inventive devices.

The device according to FIG. 13 has parallel linear guides G1, G2 which are, for example, arranged vertical and parallel to one another. Linear drives A1, A2 are displaceable on the linear guides G1, G2. These linear drives support further linear guides (G1,), (G2) and further linear drives (A1), (A2) displaceable thereon. The linear guides (G1,), (G2) extend parallel to the linear guides G1, G2. The ends of the connecting arms VA1, VA2 are pivotably connected to the linear drives A1, A2 and their opposite ends are connected to the end point P of the rod body K. It has a further end point P' which is connected with the connecting element VE to the end point P. The end point P' is pivotably connected with the connecting arms (VA1), (VA2) to the linear drives (A1), (A2).

The slide path (G1,), (G2) of the drives (A1), (A2) of the connecting arms (VA1), (VA2) for adjusting the end point P' are supported on the drives A1, A2 for adjusting the end point P. The advantage of this embodiment is that upon changing the position for a constant orientation of the connecting element VE the drives A1 and A2 must not be moved. When the drives A1, A2 are displaced synchronously in the same direction along the linear guides G1, G2, the linear guides (G1,), (G2) are entrained. For such a position change of the rod body K, respectively, of the connecting element VE, the drives (A1), (A2) must not be displaced.

In order to change the orientation of the rod body K, respectively, of the connecting element VE, the drives A1, A2 can be displaced in opposite directions. In this situation, the drives (A1), (A2) can also maintain their position. However, it is also possible to move the drives (A1), (A2) in opposite directions and to maintain stationary the drives A1, A2. Of course, the drives A1, A2, (A1), (A2) can also be displaced in combination with one another in order to adjust the position and/or the orientation of the body K, respectively, of the connecting element VE.

Figure 14:
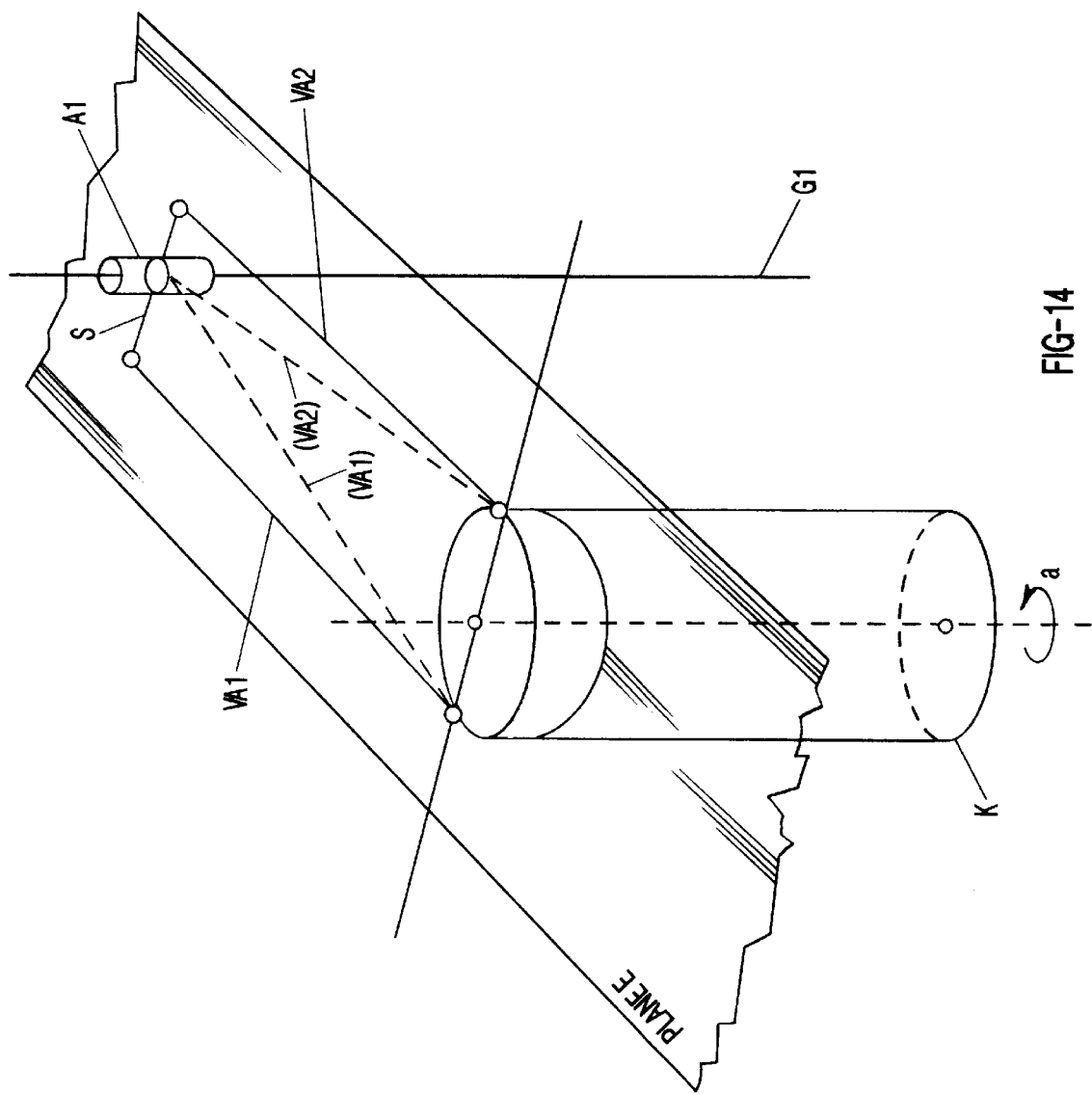

FIG. 14 shows a schematic arrangement for a rotational securing of the rod body K about an angle $\alpha$ in the cross-sectional plane E with a parallelogram arrangement that comprises the parallel connecting arms VA1, VA2. Rotational securing is needed for the rod body K because the definition via the two end points leaves undefined the 6th degree of freedom, i.e., rotation of the rod body K about the angle $\alpha$. The parallelogram ensures a directional stability for the angle $\alpha$ even for a rotation of the rod body K about the slide path G1, as long as the rod S of the parallelogram remains directionally stable. The rod S is provided at the linear drive A1 and extends transverse to its displacement direction along the glide path G1. At the two ends of the rod S pivot joints are provided to which are connected the ends of the connecting arms VA1, VA2. The opposite ends of the connecting arms VA1, VA2 engage oppositely arranged sides of the rod body K and prevent that it can be rotated about its axis.

In FIG. 14 it is illustrated in dashed lines that the rotational securing about the angle $\alpha$ can also be achieved with a triangular arrangement of the connecting arms (VA1), (VA2). They are connected with their ends to the same location of the rod body K as the connecting arms VA1, VA2. The other ends (base points) are directly connected to the linear drive A1.

Figure 15:
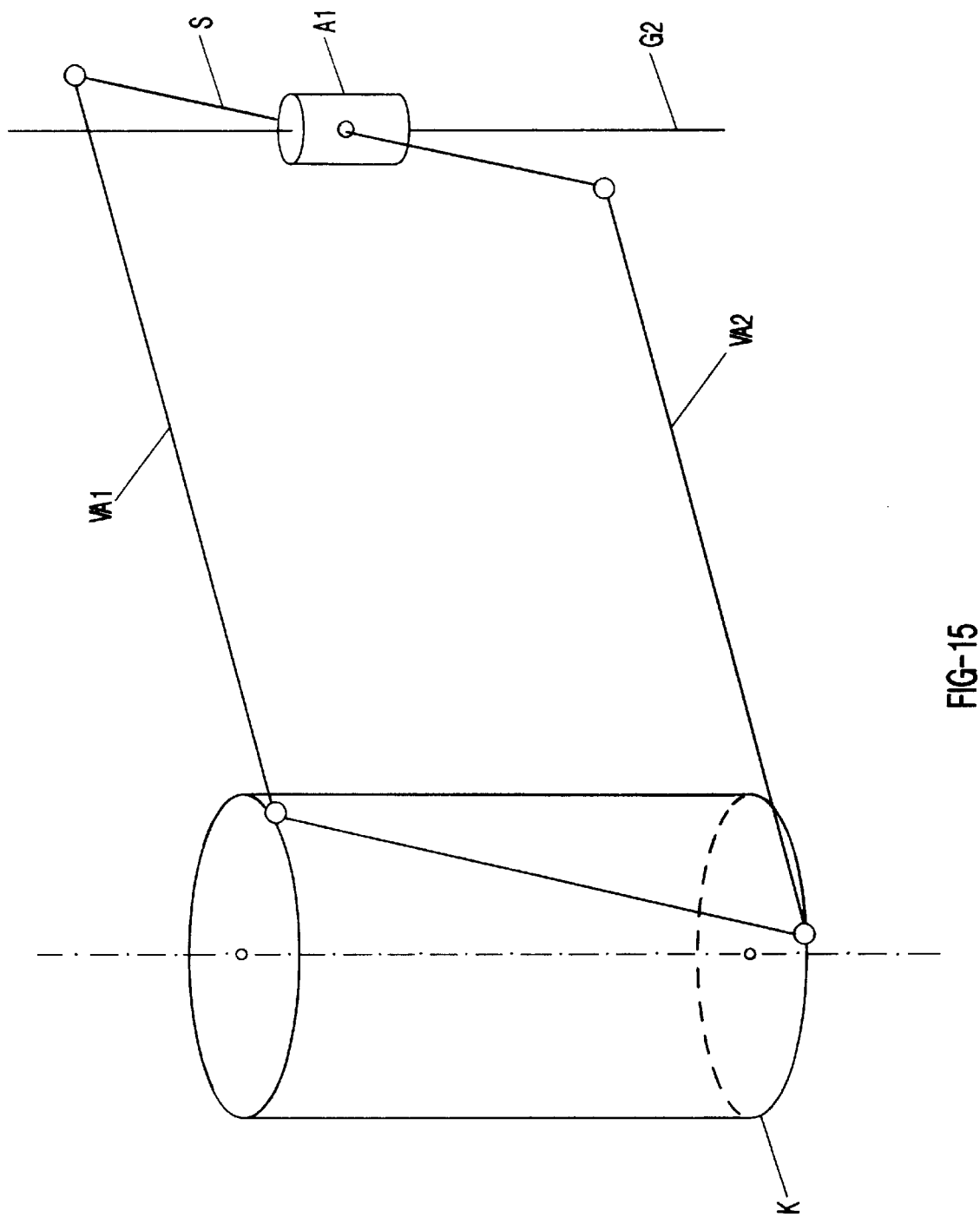

FIG. 15 shows a schematic arrangement for a rotational safety means with a parallelogram arrangement which is at a slight slant relative to the axis of symmetry of the rod body K. By slantedly arranging the parallelogram, the projection thereof onto a plane that is perpendicular to the axis of symmetry of the rod body K, a parallelogram effect according to FIG. 14 is achieved. For securing against rotation, the connecting arms VA1, VA2 are used. One of their ends is connected to the end of the direction-stable rod S which extends transverse to the displacement path of the linear drive A1 and which is displaceable on the frame-mounted linear guide G2. The opposite ends of the connecting arms VA1, VA2 engage, staggered relative to one another, the rod body K at the same side.

In this embodiment, in correspondence to the previous embodiments, the parallel-extending connecting arms lock the rotation of the rod-shaped body K about its longitudinal axis whereby these connecting arms act as a parallelogram and provide a locking axis. In the alternative triangular arrangement represented in FIG. 14, the rotation of the rod-shaped body K about its axis is locked also. The base points of the connecting arms (VA1), (VA2) coincide at one point on the linear drive A1. Due to the pivotable attachment at the rod body K these connecting arms (VA1), (VA2) define a triangle that, like the parallelogram, provides a locking axis.

In the aforedescribed embodiments the linear guides extend partly parallel to one another. Instead of such a parallel arrangement, the linear guides can also be arranged such that they are positioned at an angle relative to one another.

Figure 16:
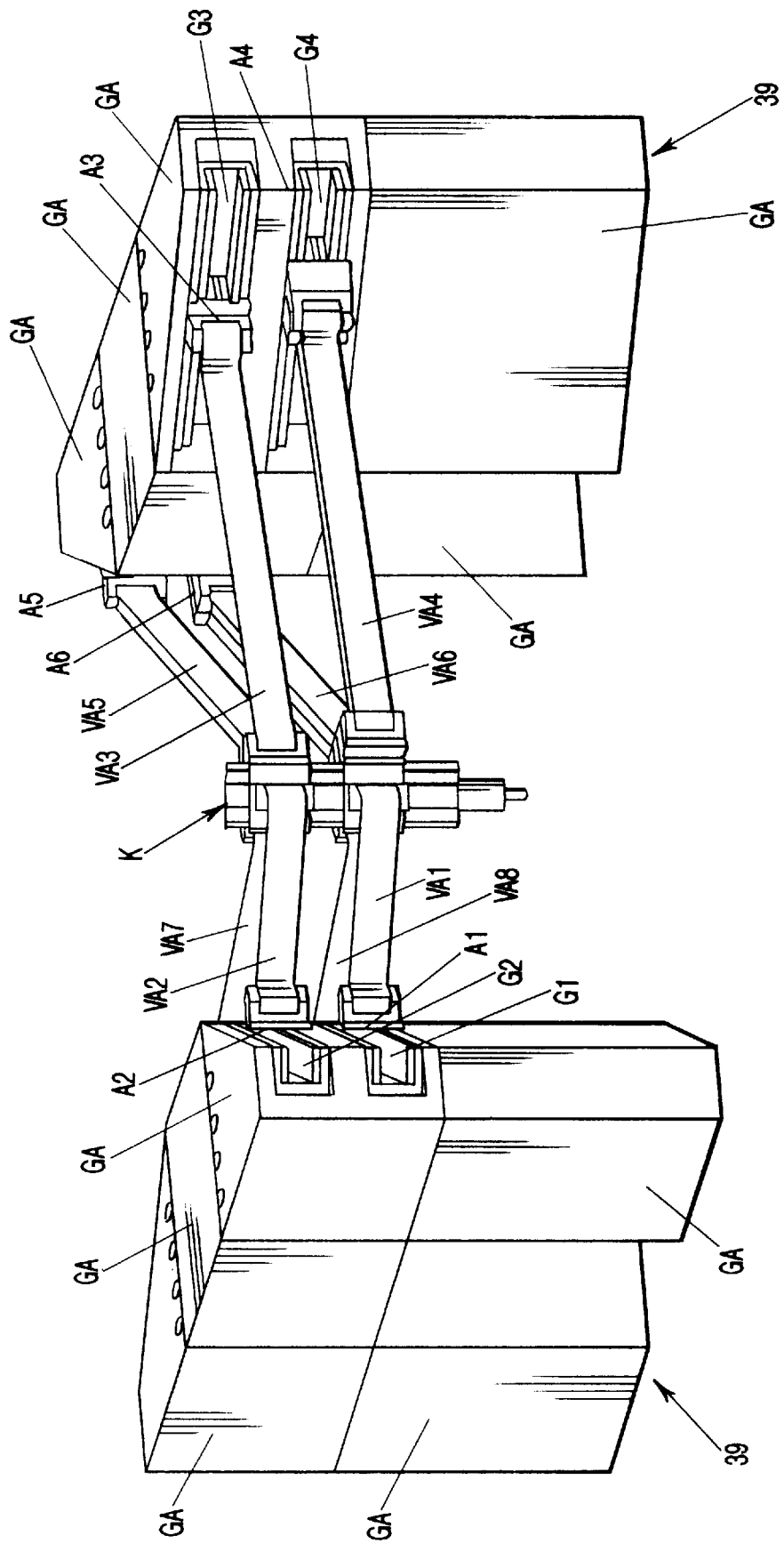
FIG. 16 shows a further practical embodiment of the inventive device.

FIG. 16 shows a device that differs from the embodiment of FIG. 12e in that for stiffening the machine a mirror-symmetrical arrangement of the drive systems is provided. This machine is of a three-axial design based on a scissor kinematic arrangement. As shown in FIG. 16, this machine has two machine frame parts 39 spaced from one another and comprised of a plurality of frame modules GA. The two machine frame parts 39 extend vertical and have four linear guides whereby FIG. 16 only shows the linear guides G1, to G4. These linear guides extend horizontally in pairs one above the other (vertically spaced). Each machine frame part 39 has linear guides extending in pairs at an angle to one another in which the linear drives are displaceable. In the linear guides G1 the linear drive A1, in the linear guide G2 the linear drive A2, in the linear guides G3 and G4 the linear drives A3 and A4, and in the non-represented further linear guides the linear drives A5 and A6 are displaceably mounted. To each linear drive one end (base point) of a respective connecting arm VA1 to VA8 is connected so as to be pivotable about a vertical axis. The opposite end of the connecting arms VA1 to VA8 are connected pivotably to the rod body K with vertical axes. The rod body K in this embodiment is a tail stock sleeve with a main spindle, as is the case also in the embodiment according to FIG. 12e. Since the axis of the rod body K is vertically arranged, a displacement perpendicular to the movement plane of the connecting arms VA1 to VA8 is possible. The vertical pivot axis of the connecting arms VA1 to VA8 extend parallel to one another and to the axis of the rod body K. The stacked connecting arms VA1, VA2; VA3, VA4; VA5, VA6; VA7, VA8 have the same length whereby the pivot axes at the rod-shaped body are aligned with one another (i.e., are vertically spaced and aligned). The rod body K is guided and positioned in the aforementioned manner by a total of four scissor arrangements. By displacing the linear drives A1 to A6 the rod body K can be moved into any desired position within the pivot plane of the kinematic scissor arrangement. It is advantageous to embody all of the linear drives for the connecting arms VA1 to VA8 as active drives in order to be able to adjust the desired position of the rod body K.

The two machine frame parts 39 are each comprised of individual modules which will be explained in more detail with the aid of FIGS. 18 and 19. Due to the modular construction, different machine frames can be designed as a function of the desired machine bed specifications. In the embodiment according to FIG. 16 the two machine frame parts 39 are comprised of five frame modules GA. Only two frame modules are provided respectively with two linear guides. As can be seen, for example, in FIG. 12e, these frame modules can be mounted with different orientation. In this embodiment the frame modules are arranged such that the linear guides G1, to G4 extend at a slant upwardly so that the connecting arms VA1 to VA4 are adjustable in vertical planes. In the embodiment according to FIG. 16, on the other hand, the frame modules GA comprising the linear guides G1, to G4 are arranged such that the linear guides G1, to G4 extend in horizontal planes so that the connecting arms VA1 to VA8 are movable in horizontal planes. The connecting arms VA1 to VA8 can be positioned in the respective horizontal planes. However, it is also possible to arrange them such that the connecting arms of each kinematic scissor arrangement projects from the respective drive plane.

Figure 17:
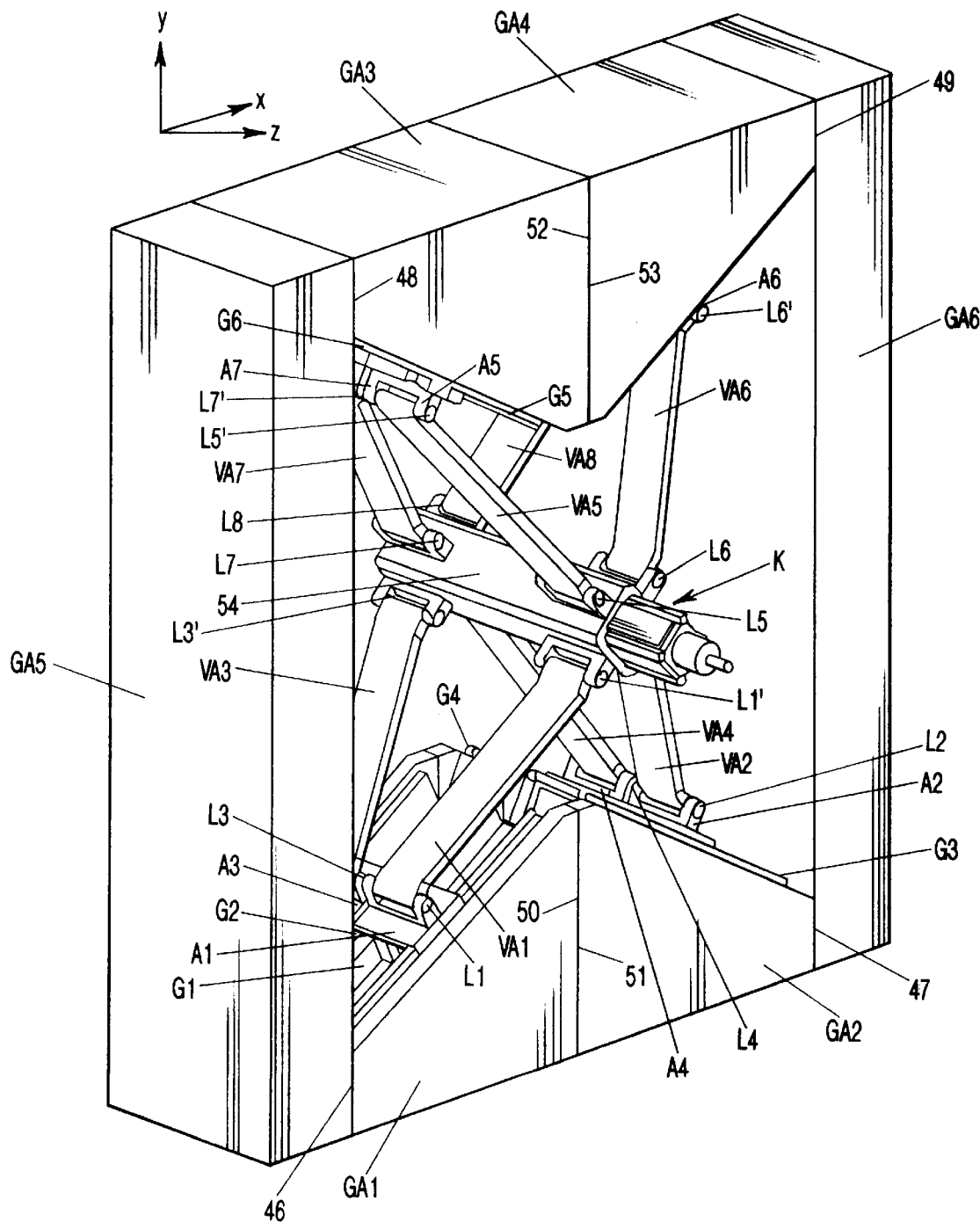
FIG. 17 shows another practical embodiment of the inventive device.

FIG. 17 shows a machine in which the rod body K is arranged horizontally. It is again in the form of a tail stock sleeve with a main spindle which is displaceable in the direction of the Z-axis. For stiffening the machine, the drive systems and the respective frame modules are mirror-symmetrically arranged to one another. The adjacently positioned frame modules GA1, GA2 and GA3, GA4 have facing sides with slantedly arranged linear guides G1, G2; G3, G4; G5, G6. The linear guides of the frame module GA4 in the representation of FIG. 17 cannot be seen. The frame modules GA1 to GA4 provide an upper and a lower frame portion. Their oppositely arranged sides are connected with frame modules in the form of vertical pillar-like modules GA5 and GA6 to form a frame. These vertical frame modules have a rectangular cross-section. The frame modules GA1 to GA6 provide a stiff frame and may be comprised of "concrete polymer" (reaction resin concrete=a polymer resin with filler materials). The frame modules GA1 to GA4 are substantially triangular and have at their ends facing away from one another narrow planar connecting surfaces 46 to 49 with which they abut facing inner sides of the pillar-shaped frame modules GA5 and GA6. Connecting surfaces 50 to 53 extend opposite and parallel to the connecting surfaces 46 to 49 and are in the vertical direction substantially longer than the external connecting surfaces 46 to 49. With these contacting surfaces 50 to 53 the frame modules GA1 to GA4 directly abut one another. The individual frame modules are connected to one another with suitable connectors.

The machine, as shown in the embodiment according to FIG. 16, can be a three-axis machine. However, it is also possible to provide this machine as a five-axis machine. The rod body K is connected by connecting arms VA1 to VA8 to the linear drives A1 to A7 which are provided on corresponding linear guides. The linear drive for the connecting arms VA8 is not visible in FIG. 17. The connecting arms are connected with their ends to the rod body K and the respective linear drives A1 to A7 so as to be pivotable about parallel extending pivot axis L1, L1'; L2; L3, L3'; L4; L5, L5'; L6, L6'; L7, L7'; L8. The other pivot axes and drives cannot be seen in FIG. 17 and are thus not provided with reference numerals. As in the previous embodiment, the connecting arms VA1 to VA8 have a constant length. The connecting arms can be arranged as in the previous embodiment such that they are positioned within the respective drive plane or project from it. While the embodiment according to FIG. 16 shows the connecting arms VA1, VA4, VA6, VA8 and VA2, VA3, VA5, VA7 extending to one side above the respective drive plane, the connecting arms of the currently described embodiment extend opposite to one another from the drive plane. For example, the neighboring connecting arms VA1, VA3; VA2, VA4; VA5, VA7; VA6, VA8 are arranged at their point of connection to the linear drives A1, A3; A2, A4; A5, A7; A6 so as to diverge. The distance between the corresponding pivot axes at the linear drives is thus smaller than at the rod body K. Due to this slanted and oppositely oriented arrangement of neighboring connecting arms an extreme increase of the stiffness of the machine in the direction of the Z-axis results. The pivot axis provided at the rod body K are provided at a common base body 54. The ends of the connecting arms VA1, VA2, VA5, VA6 and VA3, VA4, VA7, VA8 are positioned in the area of the rod body K at the same level.

As in the previously described embodiment the rod body K is secured and guided by a simple kinematic scissor arrangements.

The linear guides G1, to G6 of the frame module GA1 to GA4 are positioned at a slant relative to one another as has been disclosed in connection with FIG. 16.

In a three-axis arrangement, respectively, in an embodiment in which the linear drives A3 and A4 are to be used for an orientational correction, the connecting arms can also be arranged in a crossed manner. For example, the connecting arm VA1 can be guided from the pivot axis L1 to the pivot axis L3' and the connecting arm VA3 can be guided from the pivot axis L3 to the pivot axis L1'. Thus, the constructive width of the rod body K in the direction of the Z axis is reduced. The pivot axis L1' and L3' must be connected to the rod body K in such a crossed arrangement such that they are staggered relative to one another.

Figure 18:
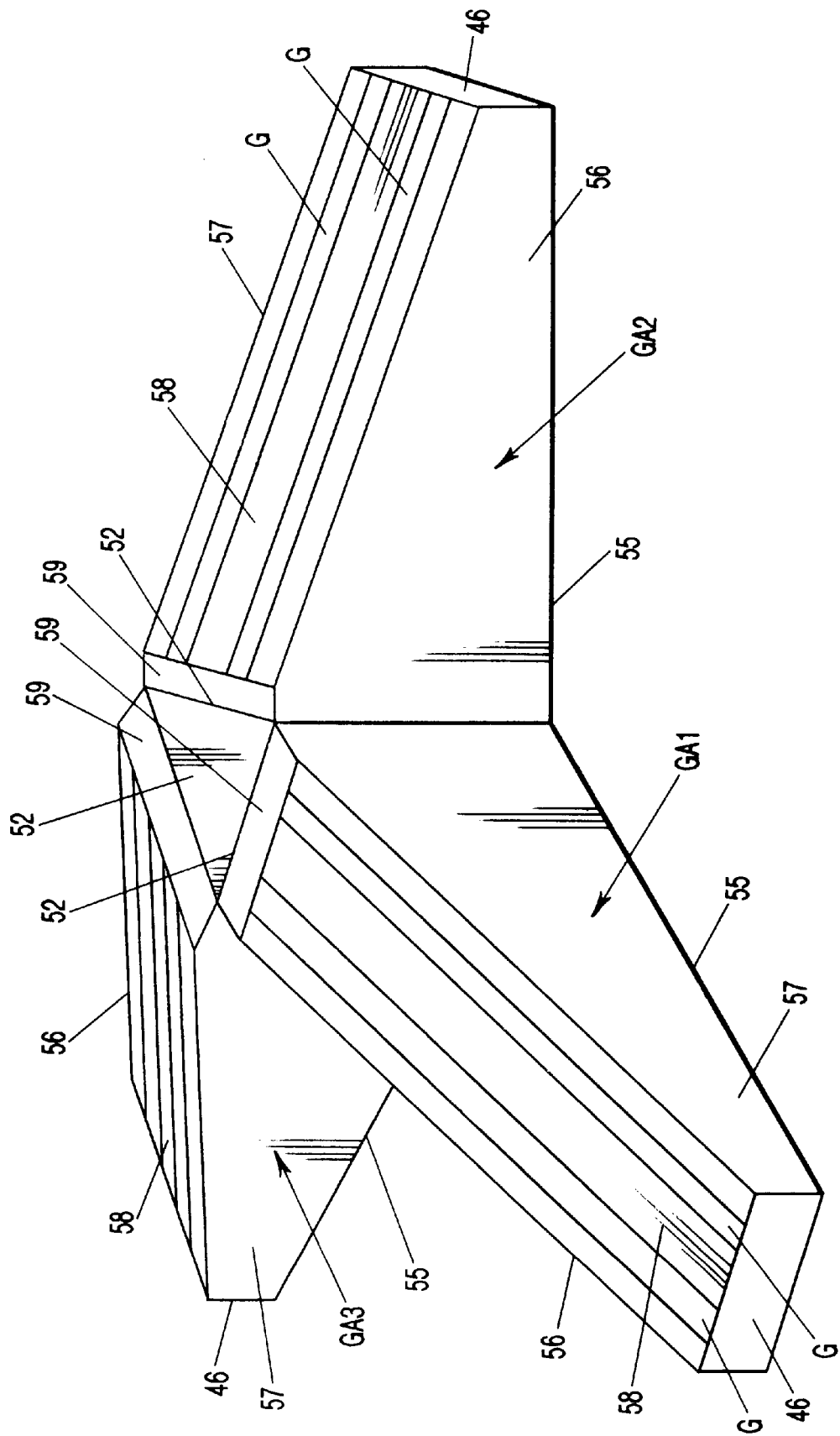

FIG. 18 shows three frame modules GA1 to GA3 which are of identical construction. They have substantially the same shape as the frame modules GA1 to GA4 of the device according to FIG. 17. The frame modules in a side view have substantially a triangular shape and have a planar underside 55 which, in the representation of FIG. 18, rests on the ground (floor). The underside 55 has a rectangular contour. At the narrow sides of the underside 55 the connecting surface 46 extends at a right angle to the underside 55 and the other narrow side has connected thereto at a right angle the connecting surface 52 which, like the oppositely arranged connecting surface 46, has a rectangular contour. The two connecting surfaces 46, 52 of each frame module GA1 to GA3 are connected to one another by parallel extending side surfaces 56, 57. These surfaces 56, 57 extend at a right angle to the connecting surfaces 46, 52. The upper side 58, positioned opposite to the underside 55, extends from the upper edge of the connecting surface 46 at a slant upwardly into the vicinity of the upper edge of the oppositely arranged larger connecting surface 52. The slantedly arranged upper side 58 has a transition into a narrow planar end face 59 extending parallel to the underside 55 which connects the slanted upper side 58 with the upper edge of the connecting surface 52. Since the frame module GA1 to GA3 are of identical construction, the end faces 59 are positioned in a common plane.

The upper sides 58 of the frame modules GA1 to GA3 are provided with linear guides G that extend parallel to one another and parallel to the lateral edges of the upper side. They receive the non-represented linear drives. In machine frames as, for example, represented in FIG. 16, the frame modules may also be provided without linear guides so that these frame modules, for example, may serve as carriers for frame modules provided with linear guides. In the embodiment according to the embodiment of FIG. 18 the frame modules GA1 to GA3 are positioned at an angle of 60° relative to one another, whereby the frame modules with their edges extending in the vertical direction abut one another. The frame modules can be fixedly connected to one another in a suitable manner. Connectors for this purpose are well known and available in various embodiments.

Of course, the frame modules can also be positioned at other angles relative to one another. Also, the frame modules can be positioned in other positions relative to one another. In the shown embodiment, the larger connecting surfaces 52 abut one another with vertical edges. However, it is also possible to arrange the frame modules GA1 to GA3 such that they are rotated by 180° so that they abut one another with their smaller connecting surfaces 46 at the respective edges. Also, the frame modules must not be arranged in a horizontal position as shown in FIG. 18. They can be suspended or can be placed on edge. A suspended arrangement of the frame modules is, for example, shown in the embodiment according to FIG. 17, showing the frame modules GA3 and GA4 suspended. Furthermore, it is possible to arrange the frame modules GA1 to GA3, for example, such that their connecting surface 52 rests on the ground. In this case, the underside 55 and/or the side surfaces 56, 57 can be used as connecting surfaces. Furthermore, it is possible to arrange the frame modules GA1 to GA3 such that their side surfaces 56 or 57 rest on the ground so that in this case the upper side 58 is positioned in a vertical plane.

FIG. 19 shows in an exemplary manner that four frame modules GA1 to GA3 can be arranged at a right angle to one another. In this case, the frame modules can be arranged so as to overlap slightly as is shown for the frame modules GA1, GA3 and GA4. In this case the frame modules do not abut with their edges but with their surfaces. The oppositely arranged frame modules GA1 and GA3 overlap the frame module GA4 by the width of the planar end face 59. The frame module GA2 in the mounted state is also overlapped in a corresponding manner by the two other frame modules GA1 and GA3 positioned at a right angle thereto. The frame modules GA1 to GA4 are of identical construction as in the aforedescribed embodiment. The variants disclosed in connection with the aforementioned embodiment can also be applied to the embodiment of FIG. 19.

The present invention is, of course, in no way restricted to the specific disclosure of the specification and drawings, but also encompasses any modifications within the scope of the appended claims.

What we claim is:

1. A device for moving a rod body in space, said device comprising:

a frame;

straight, non-jointed connecting arms having first and second ends;

said connecting arms having three degrees of freedom;

a rod body pivotably connected to said first ends of said connecting arms;

a drive for each one of said connecting arms, connected to said second end of said connecting arms and mounted on said frame, for controlling an active degree of freedom of said three degrees of freedom;

wherein the rod body has a first end point and a second end point and wherein the first end point defines a spatial position within the space and wherein the first and second end points together define an orientation of the rod body in the space;

wherein a first set of said first ends of said connecting arms is connected to said first end point and wherein a second set of said first ends is connected to said second end point for controlling said first and second end points.

2. A device according to claim 1, wherein the rod body has any desired dimensions and shaping.

3. A device according to claim 1, wherein said second ends are joints selected from the group consisting of a rotatable joint for allowing rotation, a sliding joint for allowing translatory movement, and a rotatable sliding joint for allowing rotation and translatory movement.

4. A device according to claim 1, further comprising a connecting element for connecting said first and second end points.

5. A device according to claim 1, wherein said frame has linear guides and wherein said drives are guided on said linear guides.

6. A device according to claim 5, wherein said connecting arms are arranged in pairs and wherein each one of said pairs together with one of said linear guides defines a triangular kinematic base system.

7. A device according to claim 1, wherein a spacing between said first and second end points is adjustable.

8. A device according to claim 7, wherein said rod body comprises a motor and said second end point is located at said motor, wherein said motor adjusts said spacing between said first and second end points and tensions said connecting arms.

9. A device according to claim 1, wherein six of said connecting arms are provided and wherein four of said connecting arms are connected to said first end point and wherein two of said connecting arms are connected to said second end point.

10. A device according to claim 1, wherein said frame has linear guides and wherein said drives are rotatable about said linear guides.

* * * * *

UNITED STATES PATENT AND TRADEMARK OFFICE
CERTIFICATE OF CORRECTION

PATENT NO. : 5,916,328
DATED : 6/29/99
INVENTOR(S) : Günter Pritschow and Karl-Heinz Wurst It is certified that error appears in the above-identified patent and that said Letters Patent is hereby corrected as shown below:

On the title page: Item

[73] Assignee: VDW Verein Deutscher Werkzeugmashinenfabriken e.v.

Signed and Sealed this

Ninth Day of November, 1999

Attest:

Attesting Officer

Q. TODD DICKINSON

Acting Commissioner of Patents and Trademarks